(12) United States Patent
Gower et al.

(10) Patent No.: US 11,897,221 B2
(45) Date of Patent: Feb. 13, 2024

(54) MULTI-CHAMBER PELLET DIE SYSTEM

(71) Applicant: University of South Carolina, Columbia, SC (US)

(72) Inventors: Robert Michael Gower, Columbia, SC (US); Felicia Canipe, Longs, SC (US); Mary Margavio, Houston, TX (US); Juline Deppen, York, PA (US); Christopher P. Haycook, Mt. Pleasant, SC (US)

(73) Assignee: University of South Carolina, Columbia, SC (US)

( * ) Notice: Subject to any disclaimer, the term of this patent is extended or adjusted under 35 U.S.C. 154(b) by 369 days.

(21) Appl. No.: 17/022,353

(22) Filed: Sep. 16, 2020

(65) Prior Publication Data
US 2020/0406566 A1 Dec. 31, 2020

Related U.S. Application Data

(63) Continuation of application No. 15/910,070, filed on Mar. 2, 2018, now Pat. No. 10,807,339.

(60) Provisional application No. 62/466,454, filed on Mar. 3, 2017.

(51) Int. Cl.
*B29C 43/02* (2006.01)
*B22F 3/03* (2006.01)
*B30B 11/22* (2006.01)
*G01N 1/28* (2006.01)
*B30B 11/26* (2006.01)
*G01J 3/42* (2006.01)
*G01N 21/3563* (2014.01)

(52) U.S. Cl.
CPC ............ *B30B 11/221* (2013.01); *B30B 11/26* (2013.01); *G01J 3/42* (2013.01); *G01N 1/286* (2013.01); *G01N 2001/2866* (2013.01); *G01N 2021/3572* (2013.01)

(58) Field of Classification Search
CPC ....... B29C 33/20; B29C 43/361; B29C 43/50; B29C 2043/3283; B29C 2043/3623; B29C 2043/503; B29C 2043/5808; B29C 2043/5858; B30B 11/26; B30B 11/221; B30B 15/022; B30B 15/04; B30B 15/067
See application file for complete search history.

(56) References Cited

U.S. PATENT DOCUMENTS

| 3,703,122 | A | 11/1972 | Farrington et al. |
| 5,407,339 | A | 4/1995 | Fehlhafer |
| 7,150,617 | B1 * | 12/2006 | Lowell ................. B30B 15/067 425/150 |

(Continued)

FOREIGN PATENT DOCUMENTS

EP 3171121 5/2017

OTHER PUBLICATIONS

Gemco Pellet Mills, Common Fault of Wood Pellet Mill and Solutions, posting date Oct. 15, 2017, site visited Apr. 25, 2020, URL :<https://web.archive.org/web/20171015215247/http://www.gemcopelletmills.com/pellet-machine-fault.html> (Year: 2017).

*Primary Examiner* — Thu-Khanh T. Nguyen
(74) *Attorney, Agent, or Firm* — Burr & Forman, LLP; Douglas L. Lineberry

(57) ABSTRACT

A multi-chamber pellet die system to improve and increase analysis pellet manufacturing capabilities by allowing for multiple pellets or biomaterial scaffolds to be fabricated simultaneously.

7 Claims, 29 Drawing Sheets

A)

B)

C)

(56) References Cited

U.S. PATENT DOCUMENTS

| | | |
|---|---|---|
| D565,689 S | 4/2008 | Downin |
| 8,387,299 B1 | 3/2013 | Brittingham et al. |
| D688,827 S | 8/2013 | Popper et al. |
| D699,303 S | 2/2014 | Coulter |
| D726,276 S | 4/2015 | Pagac |
| D735,312 S | 7/2015 | Horiguchi |
| D735,313 S | 7/2015 | Horiguchi |
| D736,364 S | 8/2015 | Horiguchi |
| 9,132,480 B2 | 9/2015 | Cripps |
| 9,233,491 B2 | 1/2016 | Stuhl et al. |
| 9,314,842 B2 | 4/2016 | Micklash, II et al. |
| 9,500,427 B1 | 11/2016 | Larue |
| D788,253 S | 5/2017 | Sapio et al. |
| 10,081,149 B2 | 9/2018 | Uozumi et al. |
| 2009/0025268 A1 | 1/2009 | Bender |
| 2017/0205177 A1 | 7/2017 | Abbott |

\* cited by examiner

All Dimensions in mm
Material to be used: 440C stainless steel
9 identical pieces to be made All Dimensions in mm
Material to be used: 420 stainless steel

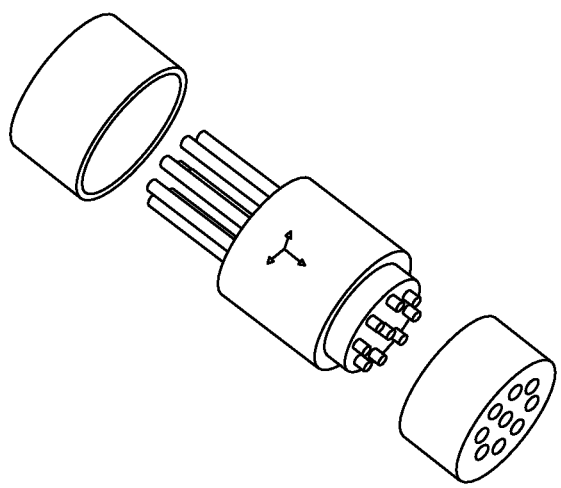
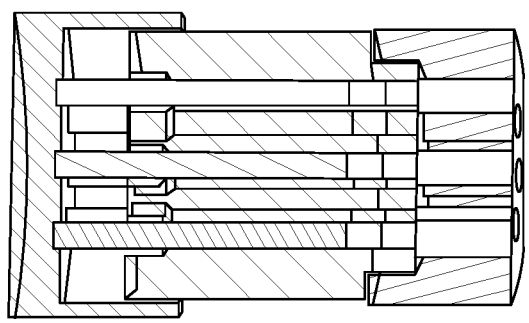
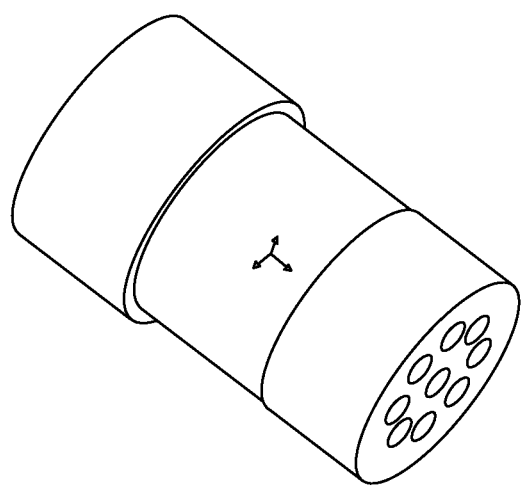
FIG. 6

Table 1 *P-Values for ANOVA, Tukey Pairwise Comparison, and F-Tests.*

| Statistical Test | P-Value |
|---|---|
| ANOVA | < 0.0001 |
| Tukey Pairwise Comparison: New Protocol One-Hole Die – Old Protocol One-Hole Die | < 0.0001 |
| Tukey Pairwise Comparison: New Protocol Nine-Hole Die – Old Protocol One-Hole Die | < 0.0001 |
| Tukey Pairwise Comparison: New Protocol Nine-Hole Die – Old Protocol Nine-Hole Die | 0.870 |
| F-Test: (Old Protocol One-Hole Die) / (New Protocol One-Hole Die) | 0.013 |
| F-Test: (Old Protocol One-Hole Die) / (New Protocol Nine-Hole Die) | 0.183 |
| F-Test: (New Protocol One-Hole Die) / (New Protocol Nine-Hole Die) | 0.974 |

FIGURE 18

Appendix 1 *Box and whisker plots for the recorded scaffold masses.* Outliers are indicated with stars in the figure.

MULTI-CHAMBER PELLET DIE SYSTEM

The current application is a Continuation of Ser. No. 15/910,070, filed Mar. 2, 2018, entitled Multi-Chamber Pellet Die System, which claims the benefit of Provisional Application No. 62/466,454 filed Mar. 3, 2017, wherein none of the above is admitted to be prior art with respect to the present invention by its mention in the cross-reference section.

BACKGROUND OF THE INVENTION

1) Field of the Invention

The present invention relates to a multi-chamber pellet die system for forming press pellets for IR Spectroscopy.

2) Description of Related Art

Infrared spectroscopy (IR spectroscopy or Vibrational Spectroscopy) is spectroscopy that deals with the infrared region of the electromagnetic spectrum: light with a longer wavelength and lower frequency than visible light. It covers a range of techniques, mostly based on absorption spectroscopy. As with all spectroscopic techniques, it can be used to identify and study chemicals.

For a given sample which may be solid, liquid, or gaseous, the method or technique of infrared spectroscopy uses an instrument called an infrared spectrometer (or spectrophotometer) to produce an infrared spectrum. A basic IR spectrum is essentially a graph of infrared light absorbance (or transmittance) on the vertical axis vs. frequency or wavelength on the horizontal axis. Typical units of frequency used in IR spectra are reciprocal centimeters (sometimes called wave numbers), with the symbol $cm^{-1}$. Units of IR wavelength are commonly given in micrometers (formerly called "microns"), symbol $\mu m$, which are related to wave numbers in a reciprocal way. A common laboratory instrument that uses this technique is a Fourier Transform Infrared (FTIR) spectrometer.

The infrared portion of the electromagnetic spectrum is usually divided into three regions; the near-, mid- and far-infrared, named for their relation to the visible spectrum. The higher-energy near-IR, approximately 14000-4000 $cm^{-1}$ (0.8-2.5 $\mu m$ wavelength) can excite overtone or harmonic vibrations. The mid-infrared, approximately 4000-400 $cm^{-1}$ (2.5-25 $\mu m$) may be used to study the fundamental vibrations and associated rotational-vibrational structure. The far-infrared, approximately 400-10 $cm^{-1}$ (25-1000 $\mu m$), lying adjacent to the microwave region, has low energy and may be used for rotational spectroscopy. The names and classifications of these subregions are conventions, and are only loosely based on the relative molecular or electromagnetic properties.

In order to be able to obtain meaningful information from an IR spectrum, one needs a spectrum with sharp peaks, which have a 'good' intensity and good resolution. Solid samples for IR analysis can be prepared in a variety of ways. One common method is to finely grind a quantity of the sample with a specially purified medium, typically potassium bromide (KBr), potassium chloride (KCl), or diamond dust, to remove scattering effects from large crystals. This powder mixture is then pressed in a mechanical press to form a translucent pellet through which the beam of the spectrometer can pass.

Forming the pellets for IR analysis is a time consuming and sensitive step. The supporting material must be finely ground and the pellet forming instruments must be treated gingerly. Pressing the die set off center will result in a bending of the head of the press. Further use of the press will bend the head even more and cause the top anvils to shear off. Excessive force applied to a pellet will damage or break the die sets and hand press used to form the pellets. Currently, pellet dies are used to press pellets for IR Spectroscopy and small biomaterial scaffolds used in tissue engineering applications. However, these pellet dies are not compatible with high throughput applications; they cannot produce more than one pellet at a time. A prior art pressing die set is shown in FIG. 1.

What is needed in the art is a multi-chamber pellet die system to improve and increase IR analysis pellet manufacturing capabilities by allowing for multiple pellets or scaffolds to be fabricated simultaneously.

SUMMARY OF THE INVENTION

A multi-chamber pellet die system for forming pellets. The system includes a die body defining at least two loading chambers, at least one anvil configured to fit within each loading chamber, at least one plunger configured to fit within each loading chamber, a cap configured to engage over the die body and secure the at least one plunger within each loading chamber while equally distributing load across all loading chambers defined within the die body, and an ejection base configured to engage the die body and to provide for evacuation of each loading chamber. Further, the load chambers may be formed so that they counter-balance one another with respect to load distribution throughout the evacuable pellet die body. Yet further, a step-down may be formed within each loading chamber. Further yet, the step-down may comprise at least a first ledge defined with a wall of each loading chamber. Still further, the step-down may be positioned at an obtuse angle with respect to a loading face of the die body. Further still, each loading chamber, at least one anvil, and at least plunger may have complimentary shapes to one another allowing for male-female engagement between each anvil and plunger with each loading chamber. Yet further, at least one loading chamber may have a unique shape, such as a different shape, larger sized, smaller sized, lower depth, shallower depth, etc. as compared to a shape of the other loading chambers defined in the die body. Still even further, the plunger may have a substantially straight-rod or cylindrical geometry. Yet even further, the plunger may be substantially columnar.

In an alternative embodiment, a method for retrofitting a pellet die system to form a multi-chamber pellet die system is provided. The method may include modifying an existing die body by forming additional cavities in the existing die body to create at least one additional void body in the existing die body, defining a step-down within each void body formed within the existing die body; and modifying an ejection base to accommodate each void body formed within the existing die body and to evacuate each void body. Further, the void bodies may be formed so that they counter-balance one another with respect to load distribution throughout the die body. Still further, a step-down may be formed within each void body. Further yet, the step-down may comprise at least a first ledge defined within an interior wall of each loading chamber. Even further, the step-down may be positioned at an obtuse angle with respect to a loading face of the die body. Even still further, each loading chamber, at least one anvil, and at least plunger may have complimentary shapes to one another allowing for male-female engagement between each anvil and plunger with each loading chamber. Further, at least one loading chamber may have a different shape as compared to a shape of the other loading chambers defined in the die body. Still further, the plunger may be shaped to have a substantially straight-rod or cylindrical geometry. Even further, the plunger may be substantially columnar in shape with a substantially flat proximal and substantially flat distal end.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 6 shows one embodiment of a fully assembled evacuable pellet die of the current disclosure.

FIG. 18 illustrates p-values for the ANOVA and Tukey Pairwise Comparisons that indicate the new batch mixing method of the current disclosure, even with the original one-hole die, produced scaffolds that had statistically higher average masses than those produced with the old protocol.

DETAILED DESCRIPTION OF A PREFERRED EMBODIMENT

Figure 1:
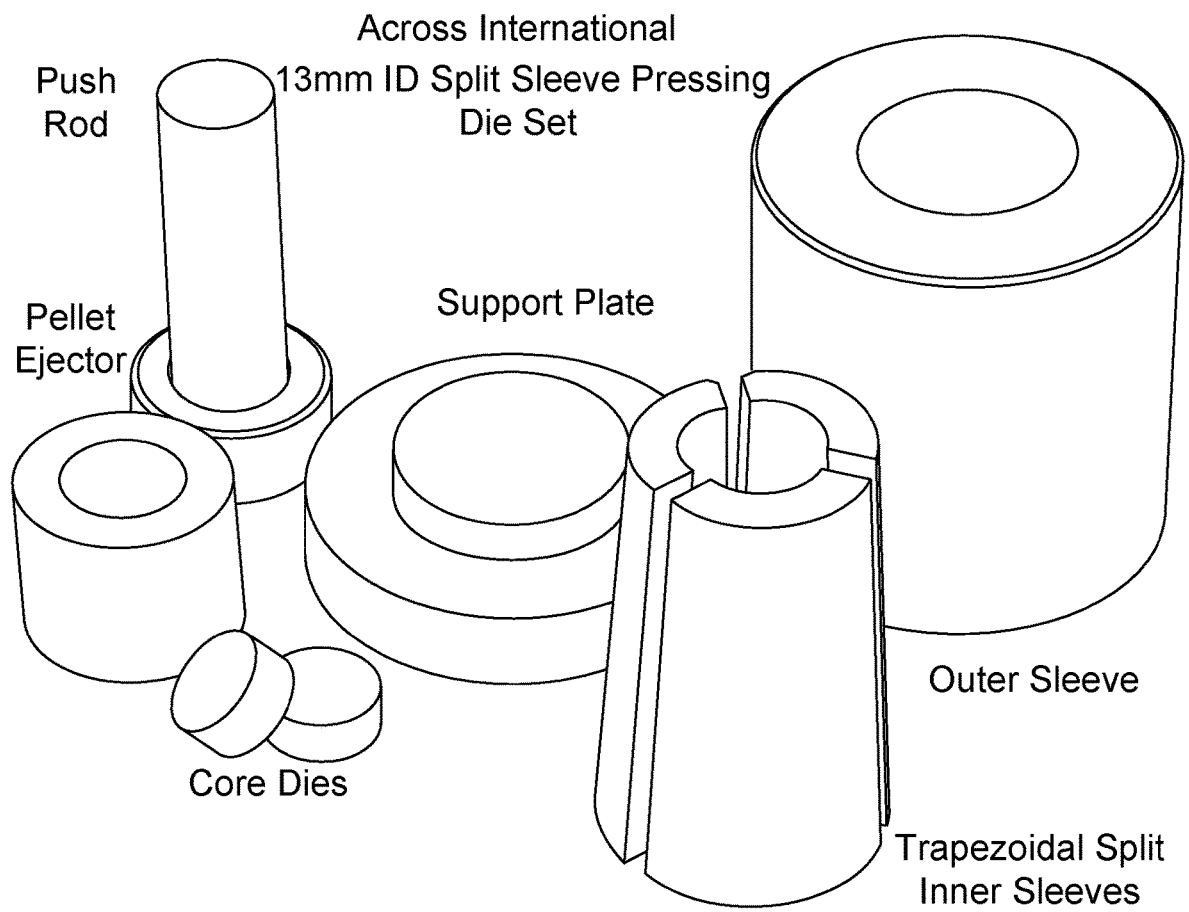
FIG. 1 shows a prior art pressing die set.

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The multi-chamber pellet die system of the current disclosure is superior to other pellet dies on the market because it increases scaffold productivity, efficiency and simplifies how pellets are made.

Die Dimensions. After researching the designs of evacuable pellet dies available commercially, the current disclosure maintained the outer dimensions of a Specac evacuable pellet die system and modified the pellet chamber features in order to create a design optimized for high-throughput biomaterial scaffold production. In this way, the outer dimensions of the current disclosure will be compatible with the Specac Atlas™ Series Autotouch 8-Ton Hydraulic Press, existing evacuable pellet die bases, and stainless steel anvils used to produce biomaterial scaffolds with the current protocol. While a Specac evacuable pellet die system was used as the base for the current disclosure, the current disclosure should not be considered limited in this aspect as other die systems may also form suitable starting points to form a die of the present disclosure.

Additionally, the outer dimensions of the smaller cylinder section at the bottom of the die were designed to be the same as that of the Specac to allow for proper interfacing with the existing Specac evacuable pellet die bases. Therefore, laboratory personnel will have the option of manufacturing biomaterial scaffolds one or multiple at a time with the Specac or the design of the current embodiment, respectively, at their discretion with minimal time lost due to changes in manufacturing procedures.

Evacuable Pellet Die Design. Currently, the Specac evacuable pellet die (Specac Limited, Orpington, Kent, England) is only capable of pressing one scaffold per loading cycle due to its single pellet chamber design. In order to maximize the production of PLG scaffolds for each loading cycle, the first embodiment of the current disclosure increased the number of pellet chambers by adding 4 equally spaced chambers in a 27 mm bolt circle formation with the same outer dimensions as the original Specac design. The number and configuration of chambers may vary and should not be considered herein limited to a specific number of chambers. The upper threshold of chambers is limited only by spacing that allows a complete chamber to be formed without interfering with an adjoining or other chamber while maintaining the die's overall structural integrity and ability to withstand the stresses generated when forming pellets.

Figure 2:
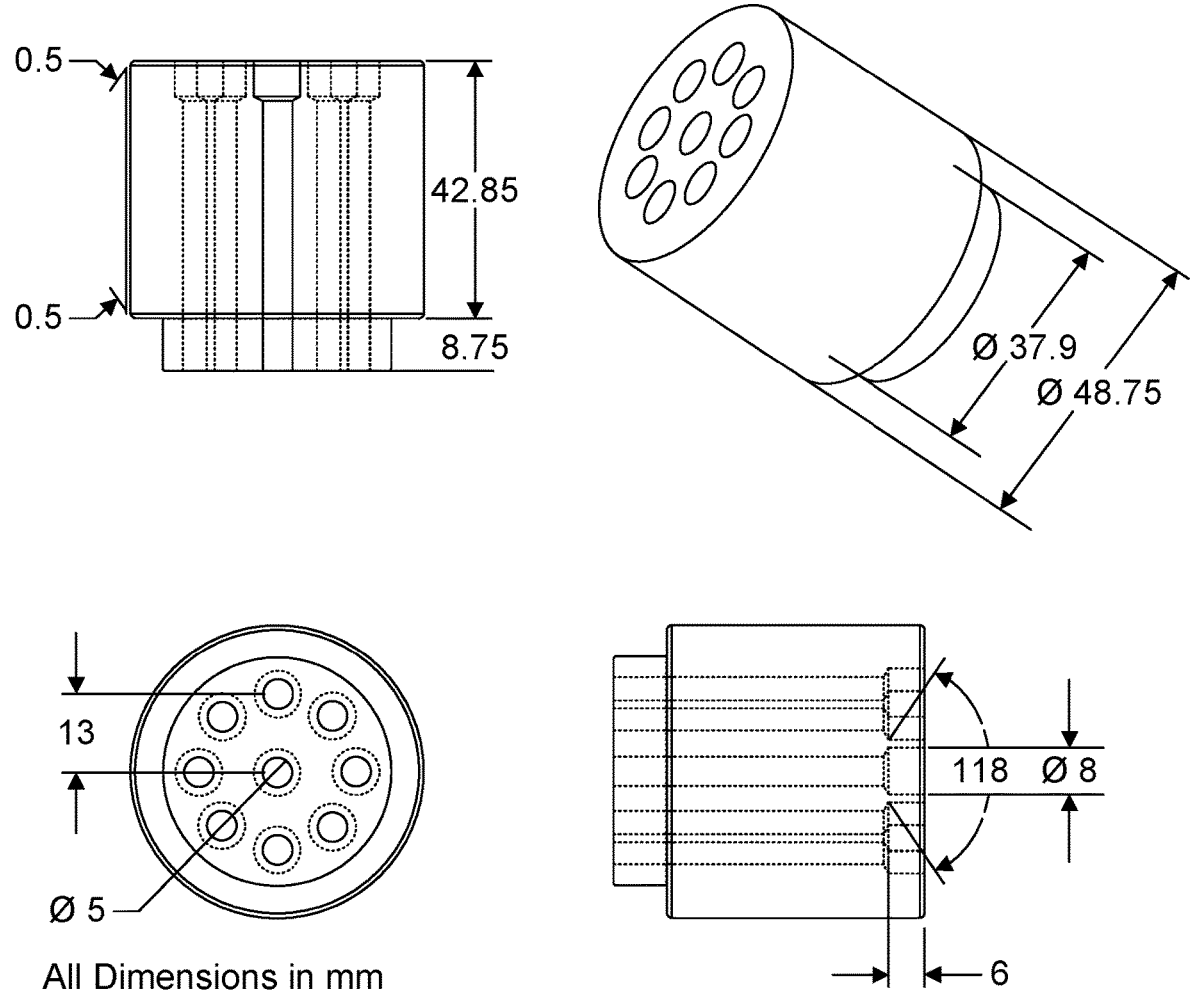
FIG. 2 shows one embodiment of an evacuable pellet die of the current disclosure.

While this solution increased the production capabilities of the die, it did not address the degree of difficulty associated with loading the Specac stainless steel anvils into each pellet chamber. The design of the pellet chamber creates difficulty for the user while inserting the stainless steel anvil from the top surface of the die due to the depth of the larger diameter section of the chamber. The user must position the anvil so that it is aligned with the center of the 5 mm portion at the bottom of the pellet chamber with a pair of tweezers from the top of the 20 mm portion of the chamber. More often than not, the user is unable to position the anvil correctly on the first attempt and, therefore, a significant portion of the manufacturing time is wasted. Moreover, the Specac design increases the difficulty that new users experience when first attempting to use the equipment, further hindering production capabilities. In order to address this concern, the current disclosure modified the diameter and depth of the upper portion of the pellet chamber. One embodiment of a evacuable pellet die of the current disclosure is shown in FIG. 2.

In one embodiment of the current disclosure, eight pellet chambers with 8 mm upper diameters were arranged in a 26 mm bolt circle formation around 1 central pellet chamber of the same diameter. The shapes created by the pellet chambers are only constrained by the ability to bore chambers into the die so that chambers do not overlap one another or otherwise interfere with forming other complete chambers taking into account the pressures exerted on the chambers during use. The depth of the upper portion was shortened from 32 mm to 6 mm in order to allow for loading of the ~6.4 mm long Specac anvils from the top surface of the die by hand rather than by using tweezers. The 8 mm diameter was chosen to provide a secure fit for the tip of the Mettler Toledo SmartPrep™ anti-static loading funnels by measuring the funnel with calipers and testing 3-D printed models of three possible chamber diameters. The 5 mm diameter of the lower portion of the pellet chamber was maintained throughout the design process due to the fact that the die was designed to press pellets 5 mm in diameter. Additionally, a 118-degree countersink hole was used to provide an angled "step-down" transition from the larger diameter upper portion of the pellet chamber to the smaller diameter lower portion. See, e.g., FIG. 23B. This angled transition was implemented in order to prevent the buildup of PLG and NaCl in the "step-down" portion during scaffold manufacturing and prevent the Specac anvils from becoming lodged within the upper portion of the chamber. The angle of the countersink was chosen because 118-degree drill bits are commonly available in most machine shops. Other angles are also applicable for the current disclosure includes ranges of angles, such as 90-100, 110-120, 130-140, 150-160, etc. Individual angles within these ranges are also possible for alternative embodiments, such 123 degrees, 138 degrees, 145 degrees, etc.

Throughout the design process of the current disclosure, several grades of stainless steel were considered to compose the evacuable pellet die: 316L, 420, and 440C. The Specac design utilizes heat-treated 440C stainless steel; however, significant rust buildup has been observed in the current pellet die during the scaffold manufacturing process due to the steel's high carbon content. In order to decrease this rust accumulation, 316L stainless steel was considered due to its considerably lower carbon content and frequent use in environments with high levels of salinity. Unfortunately, due to its lower carbon content, 316L is also much weaker than 440C and was determined not to have the required yield strength necessary for the prototype die. 420 stainless steel has a lower carbon content than 440C with a yield strength that is greater than 316L and comparable to 440C. Therefore, it provided a balance between the high mechanical strength of 440C and the superior rust resistance of 316L.

Computational stress analyses were performed to determine the best material for the evacuable pellet die design. Neither 420 nor 440C stainless steel deformed plastically in any of the stress analyses performed. 420 stainless steel was determined to be the best material for the prototype die.

Figure 1A:
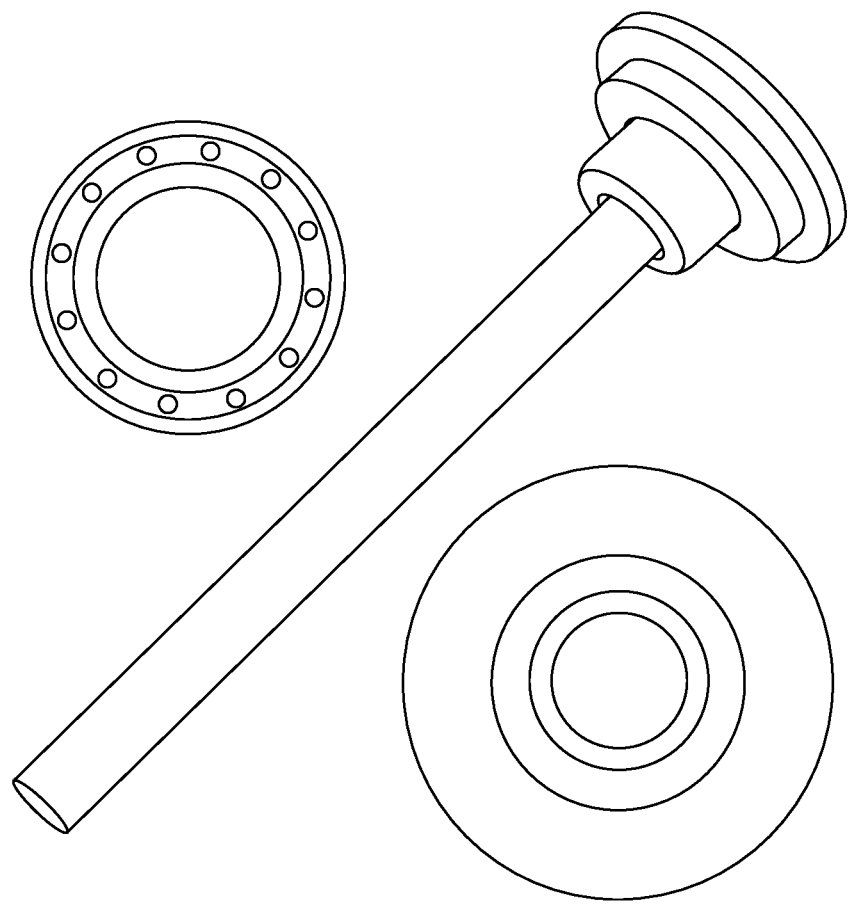
FIG. 1A shows a prior art plunger design with a "step-down" transition.

Straight-Rod Plunger Design. Due to the design changes made to the evacuable pellet die, modifications to the plungers and ejection base component were also made pursuant to the current disclosure to account for the increased number and new geometry of the pellet chambers. The design of the Specac plunger consists of a geometry containing two cylinders of different diameters with a "step-down" transition, as shown in FIG. 1A.

After performing computational stress analyses, a stress concentration in the Specac plunger design was observed at the site of the "step-down" transition. In order to eliminate this stress concentration, a straight-rod geometry was adopted with a diameter of 4.92 mm. This diameter matched that for the small-diameter portion of the Specac plunger that is inserted into the lower 5 mm portion of the pellet chamber. The final geometry of the straight-rod plunger prototype is shown below in FIG. 3. Throughout the design process, the same grades of stainless steel considered for the evacuable pellet die were also considered for the straight-rod plungers. After performing computational stress analyses, 440C stainless steel was determined to be the best material for the new plunger design.

Ejection Base Design. The ejection base, see FIG. 4, serves to remove the Specac stainless steel anvils and biomaterial scaffolds or IR pellets from the evacuable pellet die chambers once the scaffolds and/or pellets have been pressed. The Specac evacuable pellet die base is removed from the die and replaced with the ejection base while the plunger, anvils, and scaffolds are still within the chambers. The assembly is then transferred to a smaller one-half ton manual press that applies enough force to the plungers to dislodge the anvils and scaffolds from the die through the chambers in the ejection base and into a collection dish.

Figure 4:
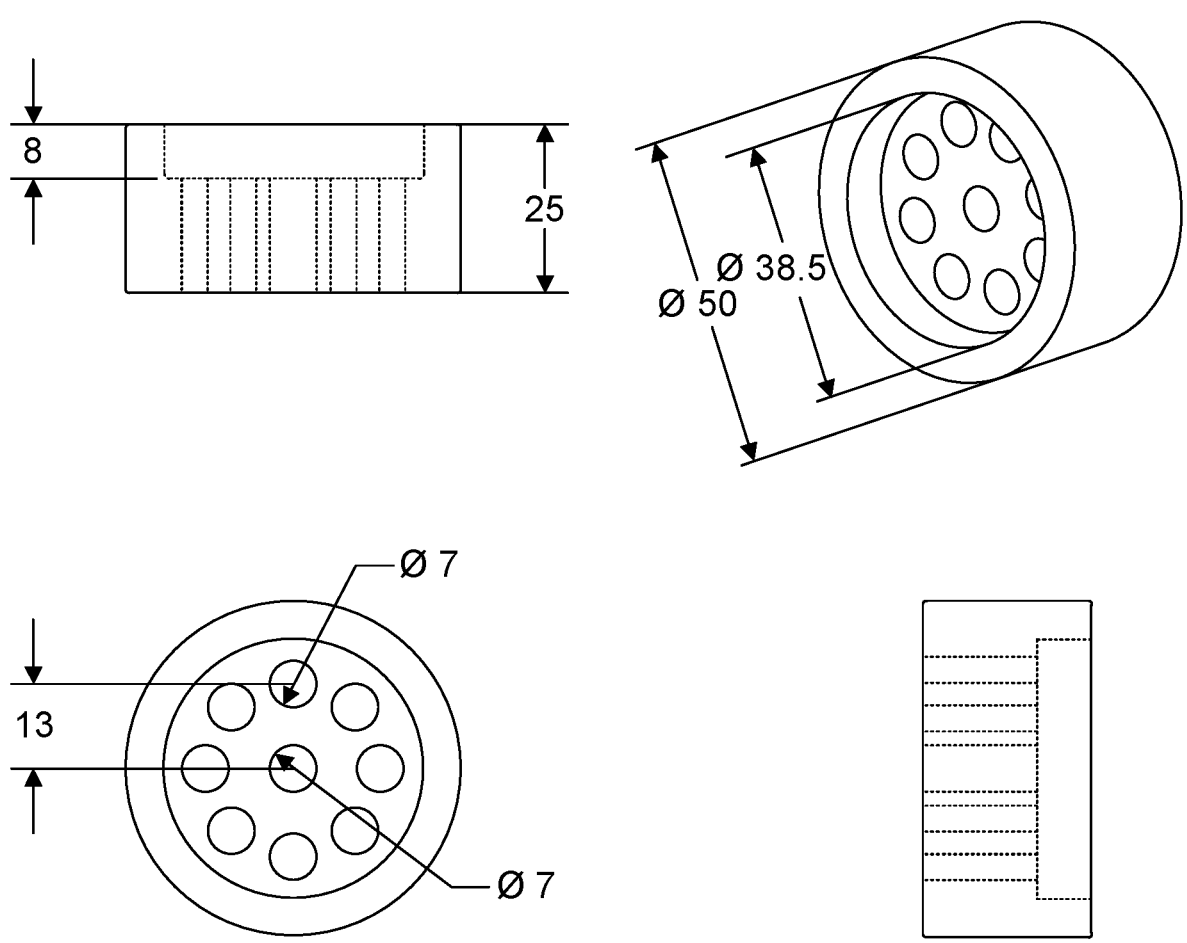
FIG. 4 shows one embodiment of an ejection base for the current disclosure.

The design of the Specac ejection base was modified to suit the nine pellet chamber design of the current disclosure. Eight additional ejection chambers with 7 mm diameters were added in a 26 mm bolt circle pattern around a central ejection chamber of the same diameter. The diameters of the ejection chambers were intentionally oversized compared to the diameters of the pellet die chambers to ensure that the dislodged anvils and biomaterial scaffolds would experience no added resistance as they were ejected from the die. The outer dimensions of the ejection base and the inner diameter and depth of the ejection base's central connection chamber also have the same dimensions as those in the Specac design. These features of the ejection base did not change dimensions in order to maintain compatibility with existing Specac equipment. The final geometry of the ejection base is shown in FIG. 4.

Virgin grade PTFE and Delrin (unfilled) were considered during as possible materials for the ejection base. The current Specac ejection base utilizes virgin grade PTFE due to its low coefficient of friction, excellent chemical resistance, and good machinability. Although, Delrin (unfilled) has a higher coefficient of friction and lower chemical resistance than virgin grade PTFE, it possesses excellent machinability, increased compressive strength, and is often selected as a cheaper alternative to PTFE. After performing computational stress analyses, Delrin (unfilled) was determined to be the best material for the ejection base.

Figure 5:
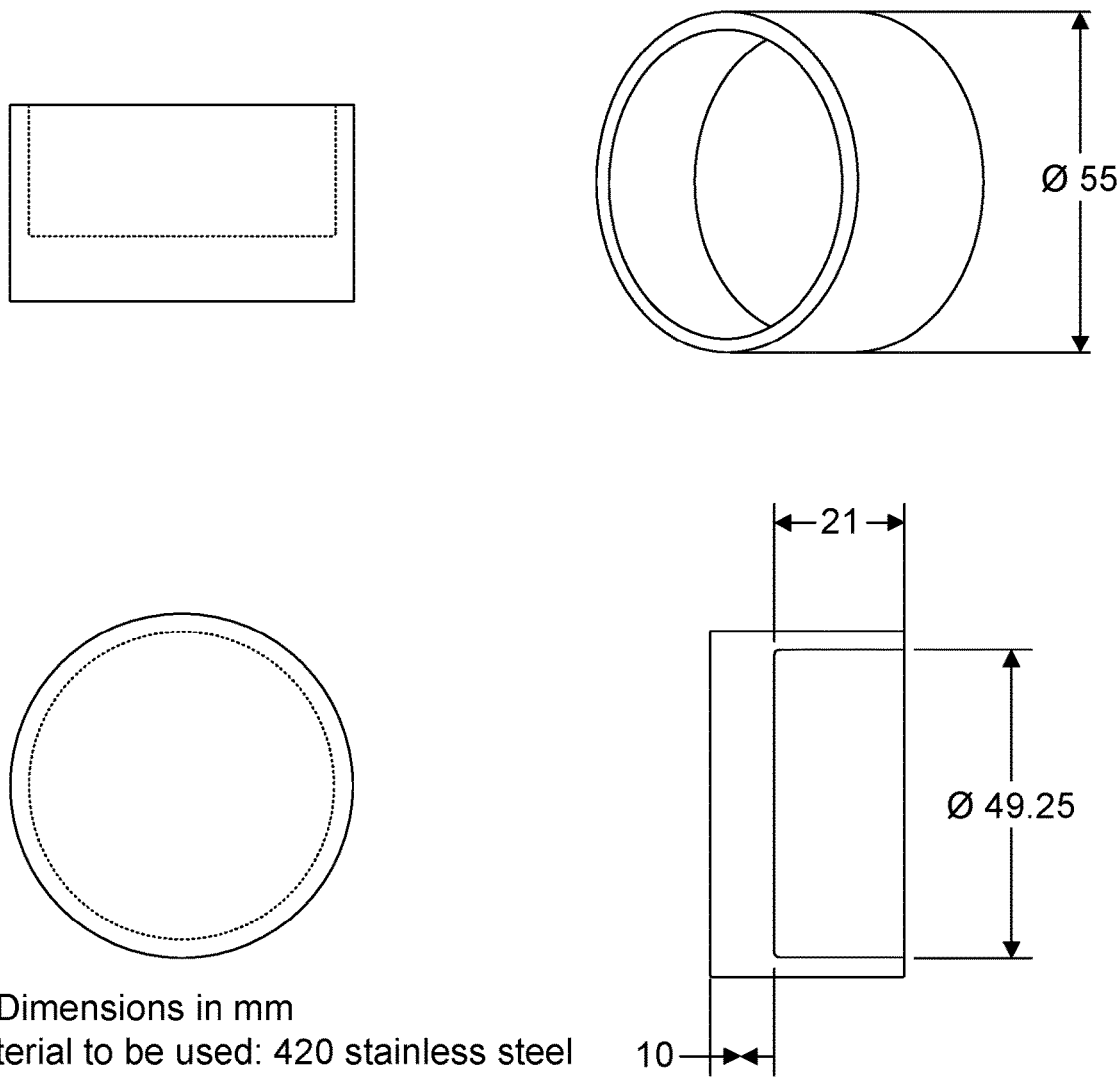
FIG. 5 shows one embodiment of a cap of the current disclosure.

Cap Design. In the prototype design, a cap component was designed in order to equally distribute the load applied by the Specac press across all nine plungers. The cap component also ensures that the prototype design will be compatible with the design of the Specac lead screw. The lead screw provides a flat surface to resist the motion of the die as the Specac Atlas™ Series Autotouch 8-Ton Hydraulic Press applies the one-ton load during the scaffold manufacturing process. The design of the cap includes a 10 mm thick flat surface which contacts the top of the straight-rod plungers. The cap has a 49.25 mm inner diameter central chamber that is 21 mm deep. The dimensions of the central chamber allow the wall of the cap to enclose the outer diameter of the evacuable pellet die, so the flat surface inside the central chamber remains perpendicular to the straight-rod plungers as the load is applied. In this way, the outer diameter of the evacuable pellet die serves as a guide to ensure the inner diameter of the cap and the outer diameter of the die remain aligned as concentric circles to resist motion that would introduce shear forces to the straight-rod plungers. The final geometry of the cap is shown in FIG. 5 below. Throughout the design process, the same grades of stainless steel considered for the evacuable pellet die were also considered for the cap. After performing computational stress analyses, 420 stainless steel was determined to be the best material for the cap design.

Die Assembly. The evacuable pellet die of the current disclosure contains the following parts: the nine-hole evacuable pellet die, nine straight-rod plungers, a cap component, and the Delrin ejection base. The total assembly is shown in the FIG. 6. In FIG. 6, view a, the nine-hole is evacuable pellet die is in the closed position. This is the position of the nine-hole evaluable pellet die when placed in the Specac Atlas™ Series Autotouch 8-Ton Hydraulic Press. FIG. 6, view b displays the cross-sectional view of the nine-hole evacuable pellet die in the closed position containing all nine straight-rod plungers. FIG. 6, view c is the exploded side view of the nine-hole evacuable pellet die encompassing the nine straight-rod plungers. This figure displays the fully assembled nine-hole evacuable pellet die with all of the following components: the nine-hole evacuable pellet die, nine straight-rod plungers, the cap component, and the Delrin ejection base.

Heat Treating and Hard Chrome Plating. In order to achieve the maximum yield strength for each component, all components made of stainless steel will be heated treated to 60 RH. Furthermore, all components made of stainless steel will be hard chrome plated, so the minimal surface roughness for all components can be obtained. The 80 RH Chromium plating will also act as a sacrificial wear layer that will further increase the yield strength of all components and allow the wear layer to be removed and reapplied as necessary without compromising the initial geometry of each component.

New Die. The outer dimensions for the components of the prototype nine-hole evacuable pellet die were determined by measuring the Specac evacuable pellet die currently used for scaffold production with calipers. All other dimensions of the nine-hole evacuable pellet were designed pursuant to the current disclosure to achieve the following: maximize the number of scaffolds or IR pellets that could be produced in one loading cycle, decrease the degree of difficulty associated with loading the Specac anvils into each pellet chamber from the upper surface of the die, and optimize the loading efficiency of each pellet chamber.

Material Selection. Research was completed to determine the materials currently used in the commercially available evacuable pellet dies. Additionally, mechanical engineering material handbooks were consulted to determine the optimal material for the prototype components. Several grades of stainless steel were considered for the evacuable pellet die, straight-rod plungers, and cap.

3D Printing. Creo Parametric files of the prototype die components were converted into the .stl file format and uploaded into CubePro 3D printing software. The printer settings were configured to match the setup configuration of the Biomedical Engineering Department's CubePro printer. ABS plastic in red, white, and blue were used to print the prototype die components. The following build settings were defined in the CubePro software for all printed components: 70 μm layer resolution, cross print pattern, hollow print strength, and dot style support structures. To test the interface between the anti-static loading funnel and the prototype evacuable pellet die, sections of the upper surface of the die were printed with 8, 8.5, and 9 mm diameter holes. Once printed, each slice was used to determine the optimal hole diameter of the pellet chamber to allow the funnel tip to be inserted easily and securely into the pellet chambers during loading. The optimal hole diameter was determined to be 8 mm, and the entire assembly of components was 3D printed to determine if the dimensions of all components interfaced correctly with one other and with the existing Specac evacuable pellet die base. Additionally, the dimensions of the assembly were determined to be compatible with the Specac Atlas™ Series Autotouch 8-Ton Hydraulic Press used to manufacture the scaffolds. Due to the resolution limitations of the CubePro 3-D printer, the 5 mm diameter pellet chambers were not completely round when printed. This phenomenon caused the Specac stainless steel anvils not to be compatible with the 3D printed model. Consequently, the current disclosure relied on reported dimensional tolerances stated by Specac for the diameter of the anvils to determine that their anvils were compatible with the prototype die design.

ANSYS Simulations. Creo Parametric files of the prototype evacuable pellet die and straight-rod plungers were converted into SolidWorks files. An assembly of the prototype evacuable pellet die and straight-rod plungers was created in SolidWorks and exported to ANSYS software for stress analysis. Due to the computational expense of the ANSYS simulation, a progression of simplifications was performed to achieve a converged solution. This solution was an adequate approximation of the loading conditions that the prototype components will experience during scaffold manufacturing.

Briefly, the initial ANSYS simulation included the first prototype assembly consisting of the evacuable pellet die with 5 pellet chambers, 5 plungers with the original "step-down" transition, 5 biomaterial scaffolds, and 10 stainless steel anvils. Bonded conditions between plungers and anvils and the anvils and scaffolds were applied. Frictionless boundary conditions were defined between the walls of the pellet chamber and the bonded components inside the pellet chambers. All components were modeled as structural steel and a static load of 1000 MPa was applied normally to each plunger. This simulation served as an initial starting point for subsequent simulations to determine if the anticipated loading behavior would occur. Although the simulation converged, the bonded components translated through one another instead of deforming due to compression. In order to achieve the proper loading behavior between components, the assembly was simplified to only include one plunger loaded in the central pellet chamber of the die with 5 pellet chambers. A similar simulation was performed that exhibited the correct loading behavior with this assembly that revealed a stress concentration present in the "step-down" transition existing on the original Specac plunger design.

Figure 3:
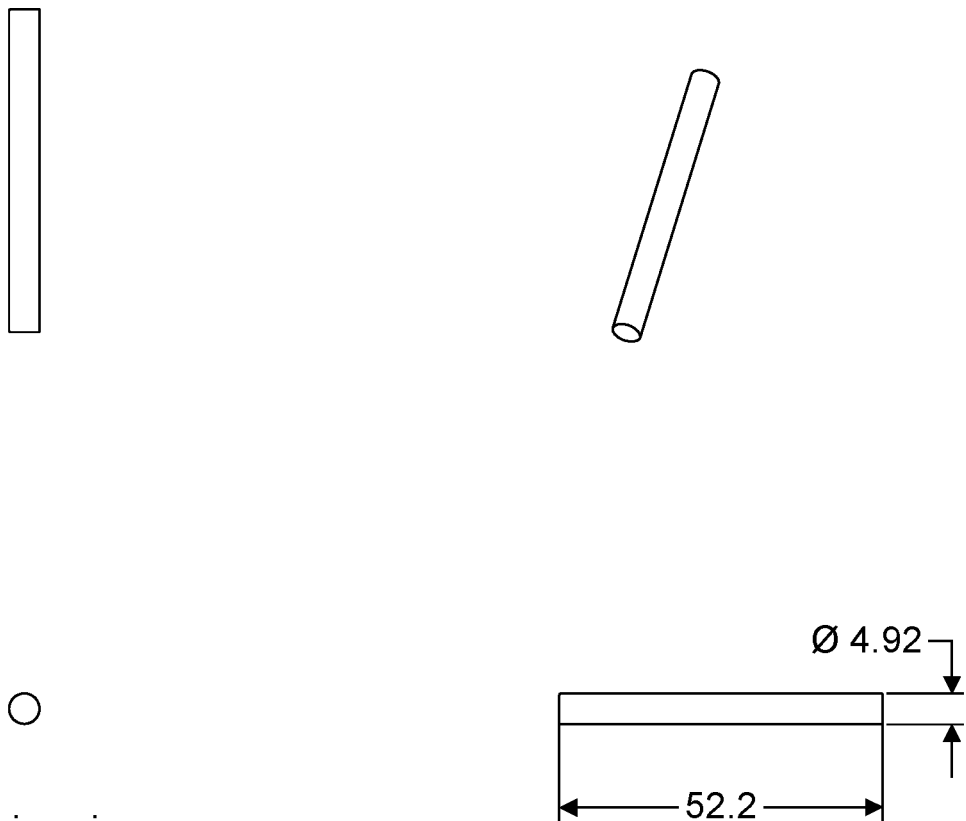
FIG. 3 shows one embodiment of a straight-rod plunger design of the current disclosure.

The final ANSYS simulation set-up was then updated to include an assembly with the newly designed nine-hole die and one straight-rod plunger loaded in the central pellet chamber and modeled as 440c stainless steel. These components are shown in FIGS. 2 and 3. Frictionless boundary conditions were applied between the plunger and the wall of the central pellet chamber. The displacement of the plunger and die was fixed in the Z-axis but not in the XY-plane. This allowed the plunger to be compressed and expand outward towards the inner wall of the pellet chamber of the die. A static load equal to one-ninth of 2 tons was applied normally to the plunger in order to account for the distribution of the load across all nine plungers. Additionally, the load applied to the plunger was two times higher than the load used in current scaffold manufacturing to provide a safety factor equal to 2. Tetrahedral elements were selected for the meshing with volumes equal to approximately 0.1 $mm^3$. The static load was applied over 100 sub-steps, each consisting of up to 26 equilibrium iterations in order to decrease the computational demand of the simulation.

Creo Parametric Simulations of the Cap and Base. Creo Parametric files of the ejection base and cap components were used to perform separate stress analyses on each individual component using the Creo Parametric software's finite element modeling (FEM) application. The cap component was modeled as 420 stainless steel, and a fixed displacement condition was applied to the top surface of the cap within a circular surface region equal to the circular cross section of the lead screw. On the flat that contacts the plungers within the central chamber of the cap, a static load of two tons was distributed across nine circular surface regions equal to the size of the circular cross sections of the straight-rod plungers.

The ejection base component was modeled as Delrin (unfilled), and a fixed displacement condition was applied to the bottom surface of the ejection base, opposite of the central connection chamber. On the flat surface at the bottom of the central connection chamber a static load equal to one-half tons, the maximum load applied by the hand press, was distributed across the flat surface.

ANSYS Simulations. After the final ANSYS simulation set-up was established, several computational stress analyses were performed to determine if the newly designed evacuable pellet die components could withstand the mechanical loads necessary for scaffold or IR pellet manufacturing without plastically deforming. For all stress analyses performed in ANSYS, the peak calculated von Mises stress was used to predict mechanical failure in the form of plastic deformation. Plastic deformation was predicted to occur if the calculated von Mises stress was higher than the reported yield stress of 440c and 420 stainless steel. The reported yield stresses for the 440c and 420 stainless steel used in these ANSYS simulations were approximately 1.22E+9 Pa and 1.38E+9 Pa, respectively.

Figure 7:
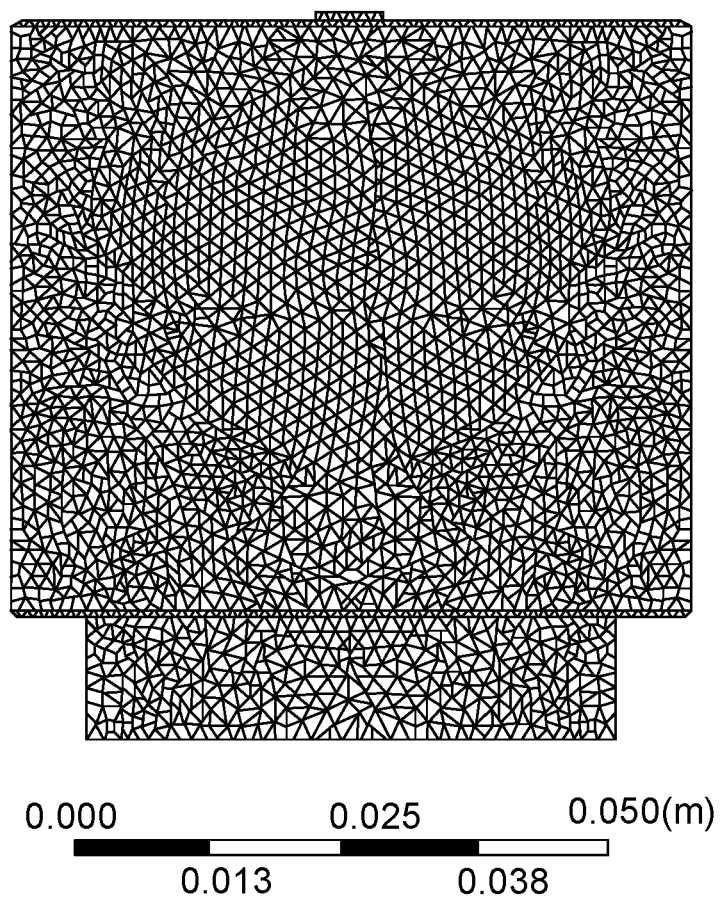
FIG. 7 illustrates a front view of meshing used in ANSYS simulations of an evacuable pellet die of the current disclosure.
Figure 8:
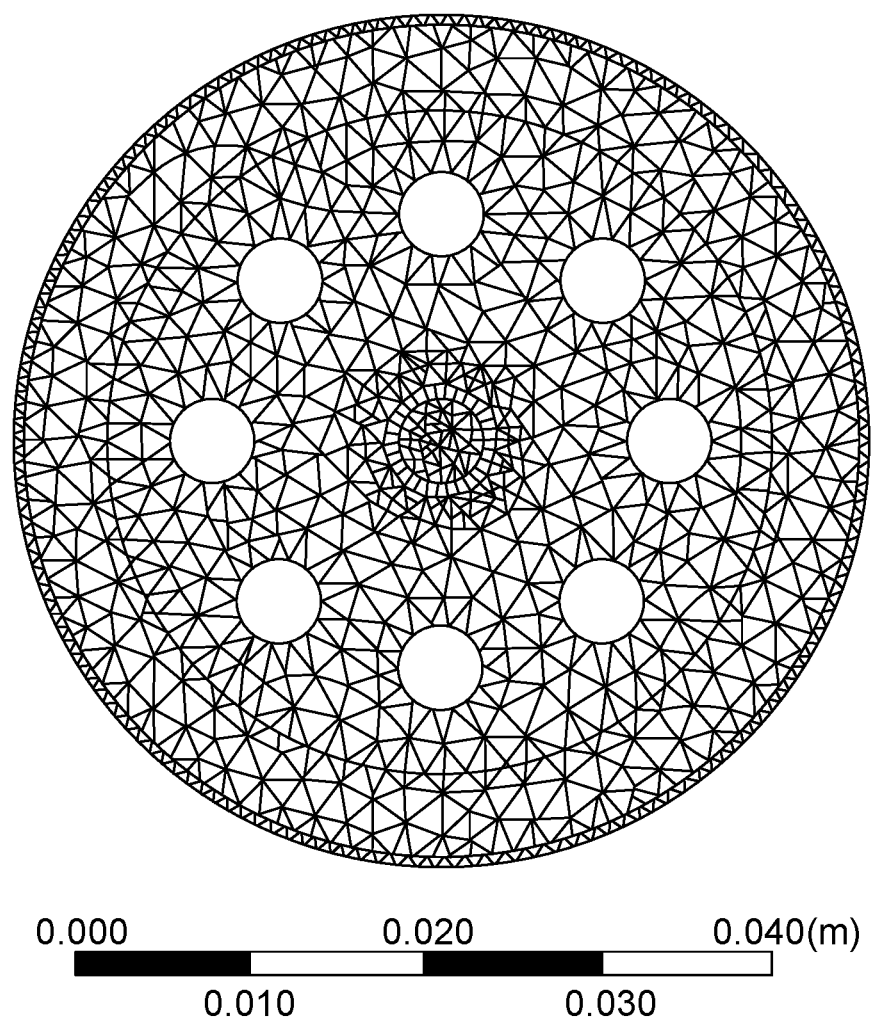
FIG. 8 shows one embodiment of a bottom view of a mesh used with ANSYS simulations of an evacuable pellet die of the current disclosure.

Two views of the defined meshing for the assembly tested in the final ANSYS simulation set-up are reported in FIGS. 7 and 8. FIG. 7 is a front view of the meshing in the assembly, and FIG. 8 is a bottom view of the meshing in the assembly. Most elements in the mesh were tetrahedral elements defined with approximate volumes of 0.1 $mm^3$. Elements of the mesh defined at the interface between the straight-rod plunger and the nine-hole die were made smaller to account for an increase of the element's anticipated displacement as the plunger deformed.

Figure 9:
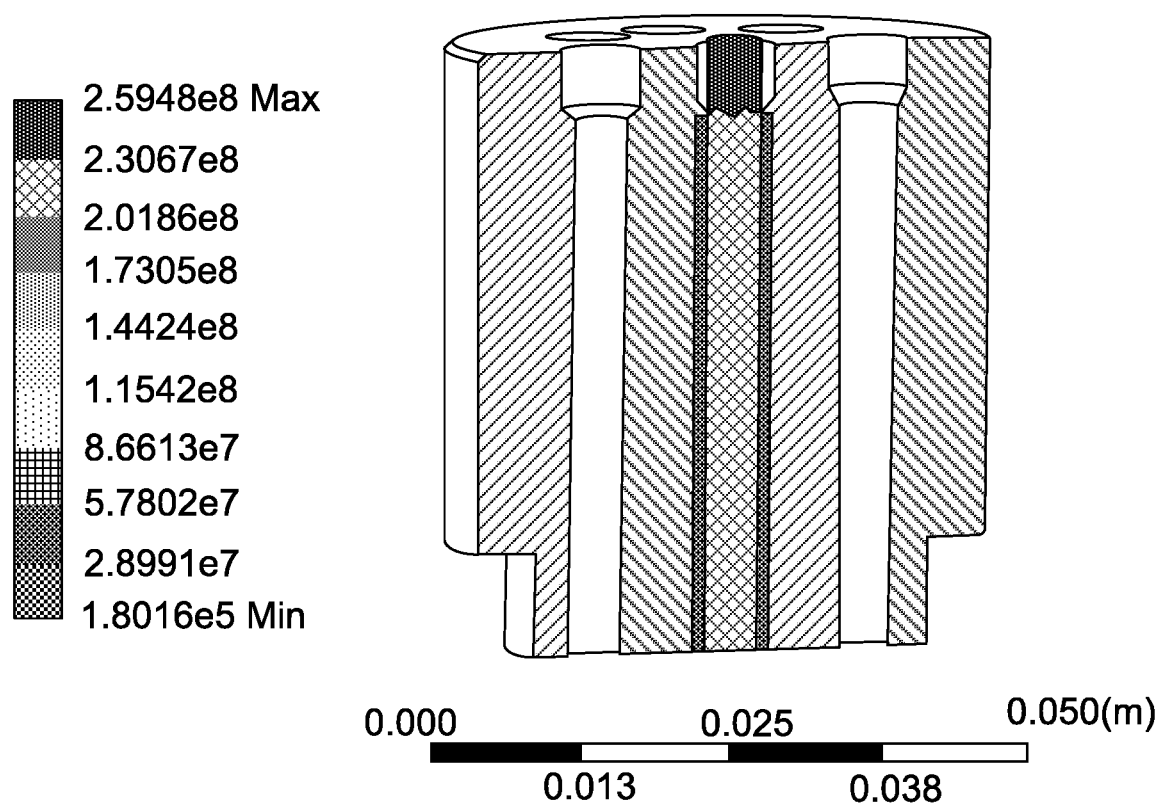
FIG. 9 shows the calculated von Mises stress in the assembly modeled as 440c stainless steel after a static load equal to one-ninth of 2 tons was applied to the upper surface of a straight-rod plunger of the current disclosure.
Figure 10:
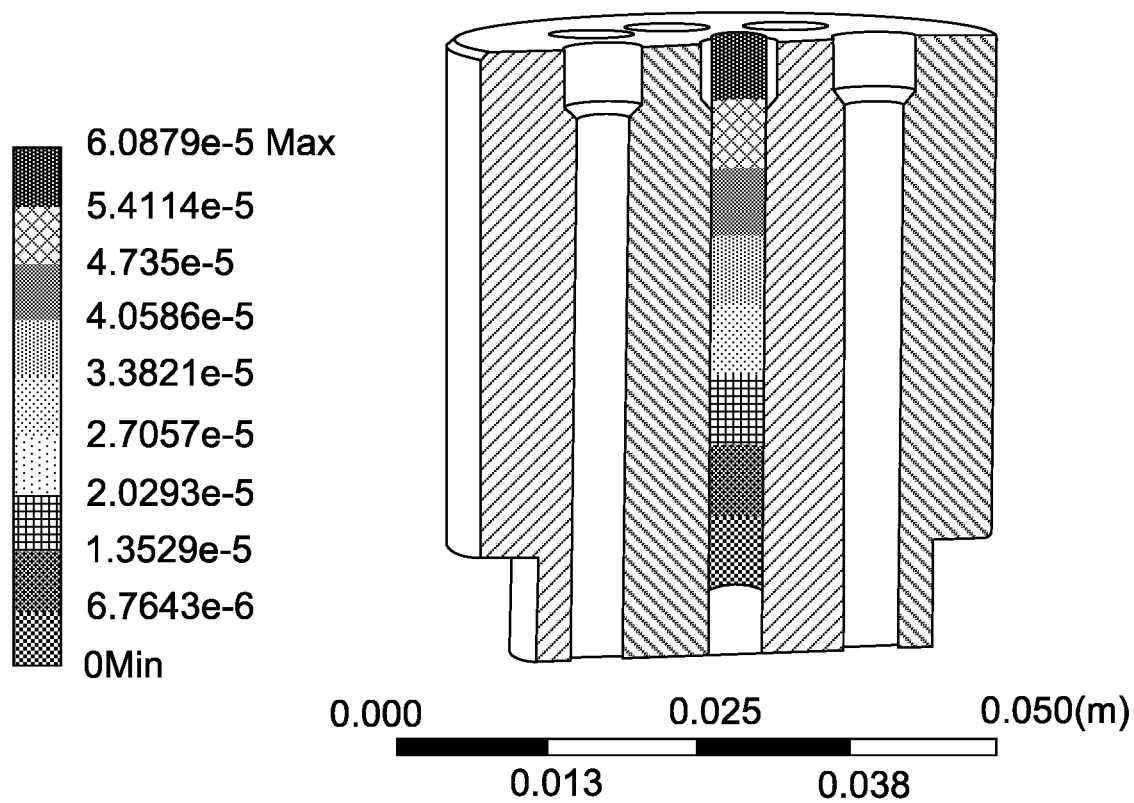
FIG. 10 shows the magnitude of the calculated deformation in the assembly modeled as 440c stainless steel after a static load equal to one-ninth of 2 tons was applied to the upper surface of a straight-rod plunger of the current disclosure.

ANSYS Simulation: 440c Partial Load. In FIGS. 9 and 10, results from the ANSYS simulation of the die assembly modeled as 440c stainless steel are shown after the application of a static load equal to one-ninth of 2 tons was applied to the upper surface of the plunger. The peak calculated von Mises stress located in the upper surface of the plunger was approximately 2.60E+8 Pa and is shown in FIG. 9. The value of the calculated von Mises stress was an order of magnitude lower than the reported yield stress of 440c stainless steel. Therefore, all deformation predicted to occur in the die assembly was assumed to be elastic, and the simulation indicated mechanical failure would not occur. The peak calculated elastic deformation in the assembly was approximately 6.09E-5 m and is shown in FIG. 10.

Figure 11:
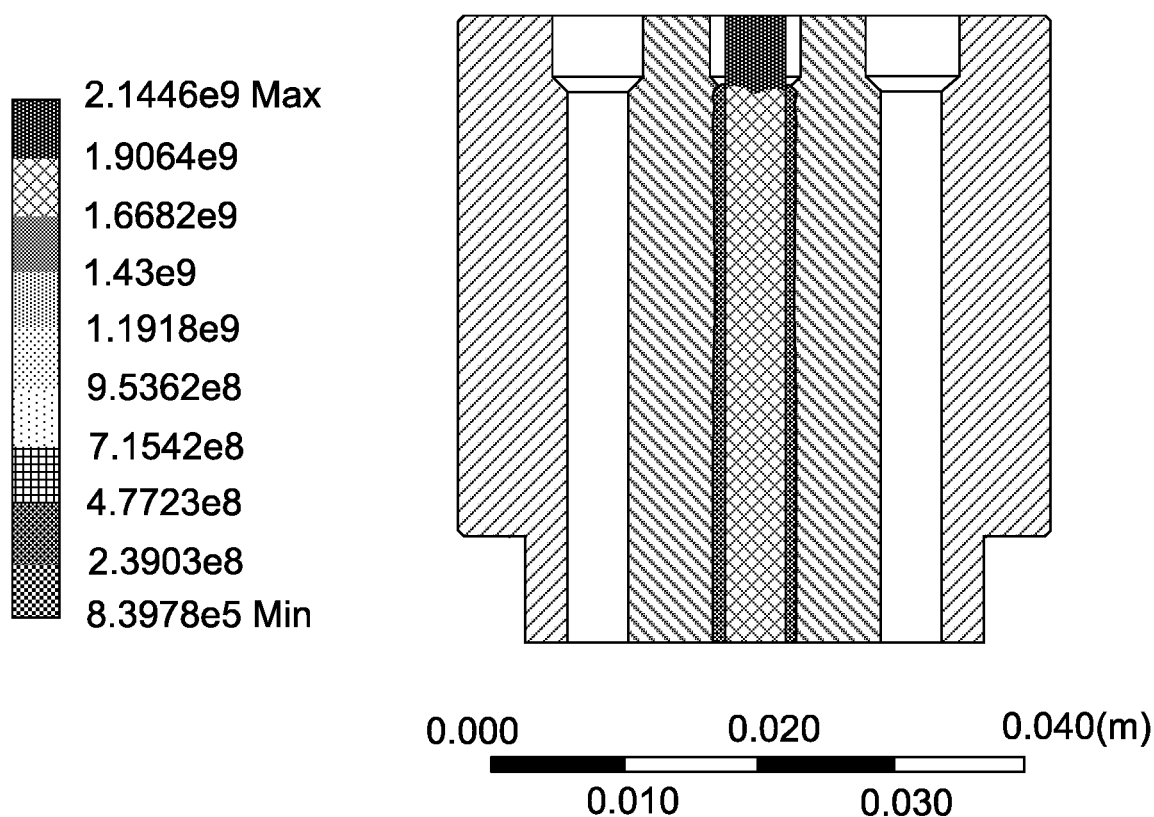
FIG. 11 shows the calculated von Mises stress in the assembly modeled as 420 stainless steel after a static load of 2 tons was applied to the upper surface of a straight-rod plunger of the current disclosure.
Figure 12:
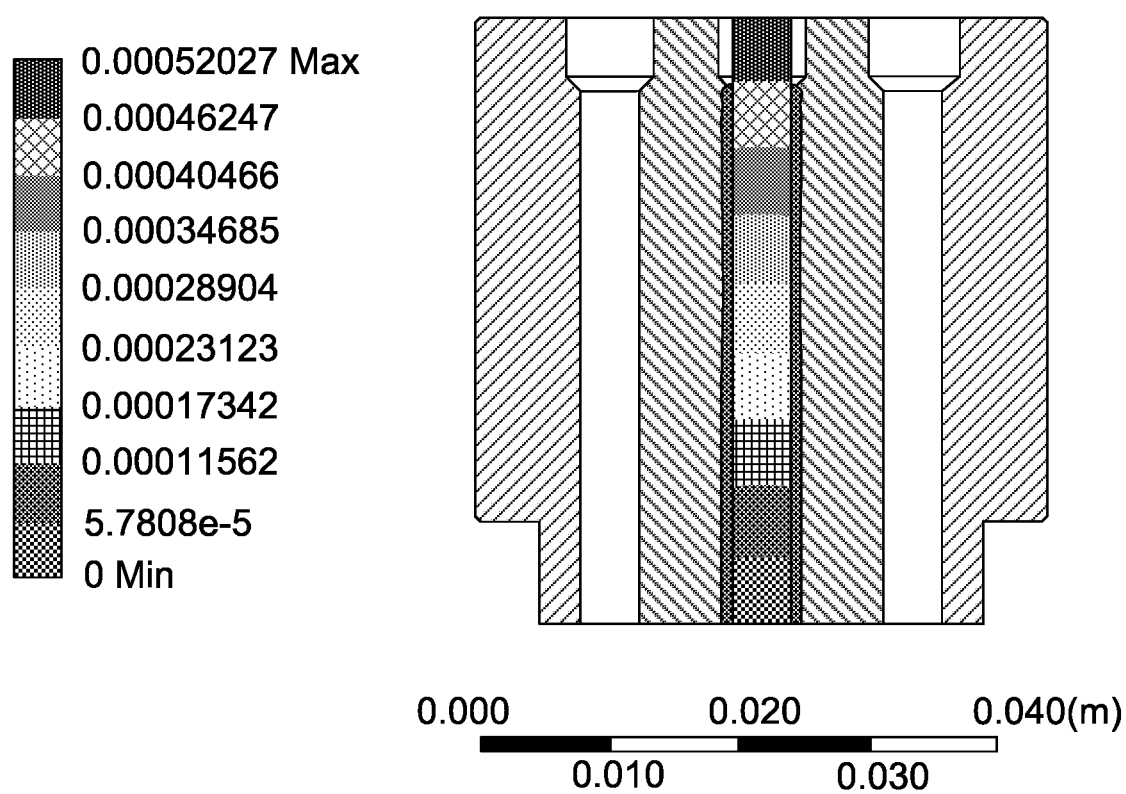
FIG. 12 shows magnitude of the calculated deformation in the assembly modeled as 420 stainless steel after a static load equal to 2 tons was applied to the upper surface of a straight-rod plunger of the current disclosure.
Figure 13:
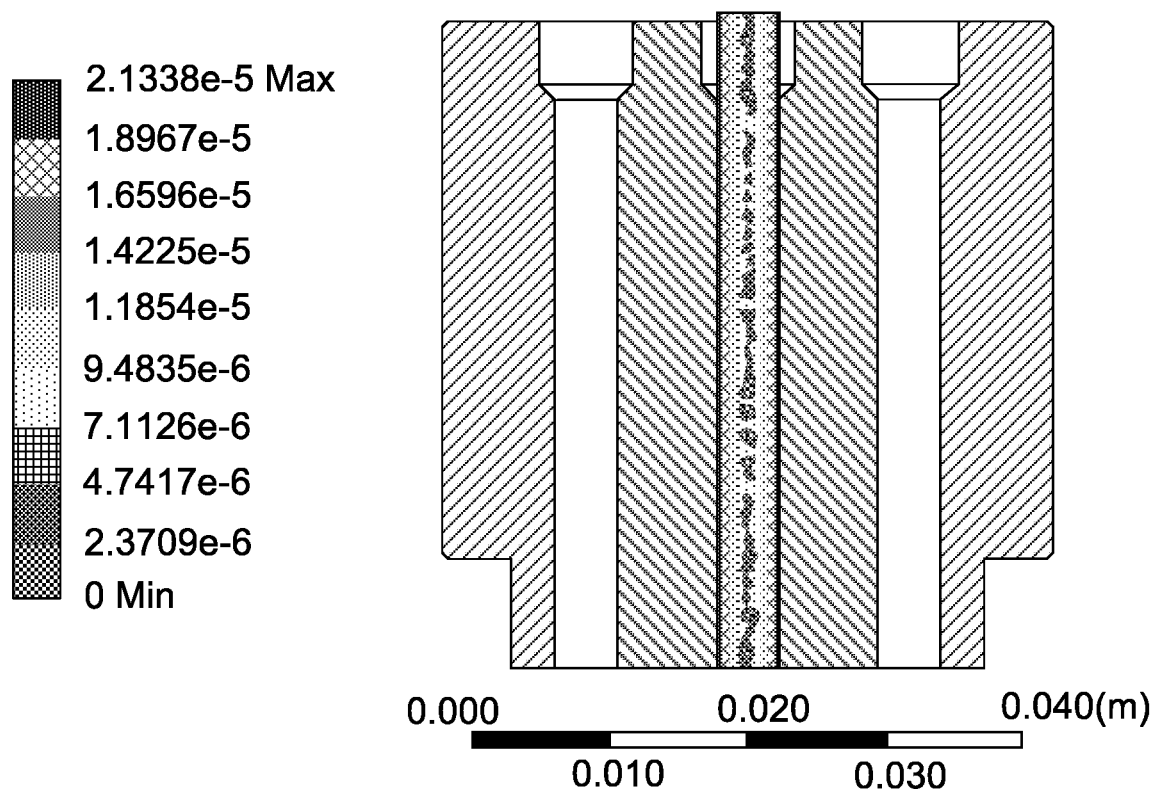
FIG. 13 shows magnitude of the calculated residual deformation in the assembly modeled as 420 stainless steel after a static load of 2 tons was applied to the upper surface of a straight-rod plunger of the current disclosure and released.

ANSYS Simulation: 420 Full Load. In FIGS. 11, 12, and 13, results from the ANSYS simulation of the die assembly modeled as 420 stainless steel are shown with a static load equal to 2 tons was applied to the upper surface of the plunger. The peak calculated von Mises stress located in the upper surface of the plunger was approximately 2.14E+9 Pa is displayed in FIG. 11. This value of the von Mises stress was higher than the reported yield stress of 420 stainless steel. Therefore, all deformation predicted to occur in the plunger was assumed to be plastic, and the simulation indicated that mechanical failure would occur in the plunger. Interestingly, the calculated value of the von Mises stress in the die was approximately 2.38E+8 Pa, an order of magnitude lower than the reported yield stress, and no deformation in the die was predicted to occur.

In FIG. 12, the peak calculated deformation in the plunger was approximately 5.2E-4 m. FIG. 13 shows the calculated residual deformation in the plunger after the static load was released. The calculated residual deformation in the plunger due to plastic deformation was approximately 2.13E-5 m. An identical loading situation for the assembly modeled as 440C was also performed in ANSYS. This analysis revealed a similar mechanical response.

Creo Parametric Simulations. After the Creo Parametric software's finite element modeling application set-up was established, two additional computational stress analyses were performed to evaluate the designs of the ejection base and cap components. As for the ANSYS simulations, the peak calculated von Mises stress was used to predict mechanical failure in the form of plastic deformation. The reported yield stresses for the 420 stainless steel ejection base and Delrin (unfilled) cap used in these simulations were approximately 1.38E+9 Pa and 6.21E+7 Pa, respectively.

Figure 14:
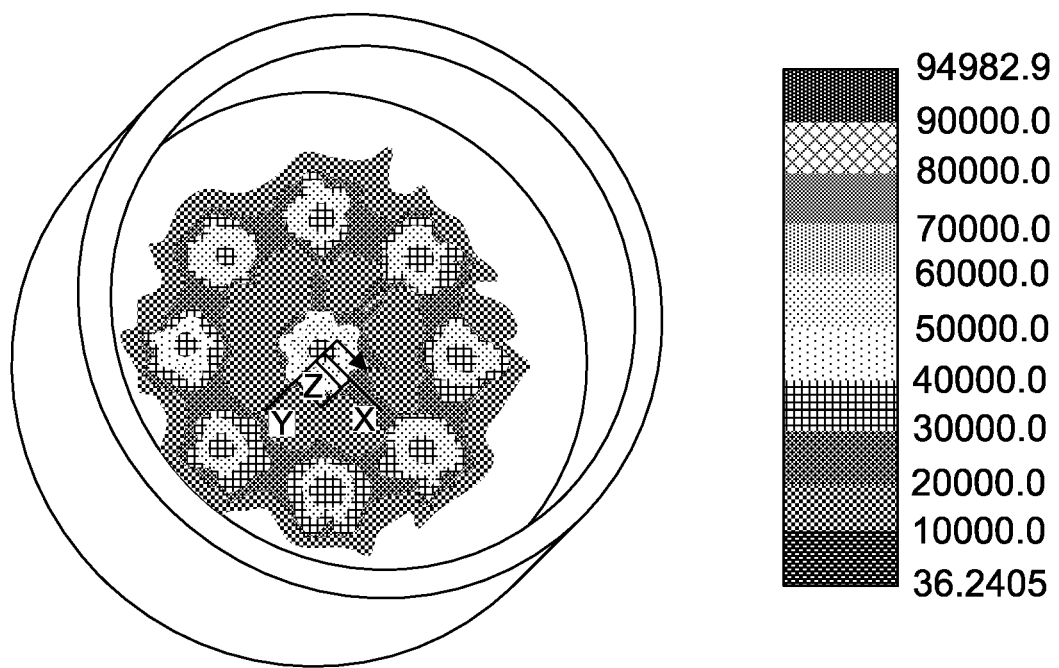
FIG. 14 shows calculated von Mises stress in a cap of the current disclosure.
Figure 15:
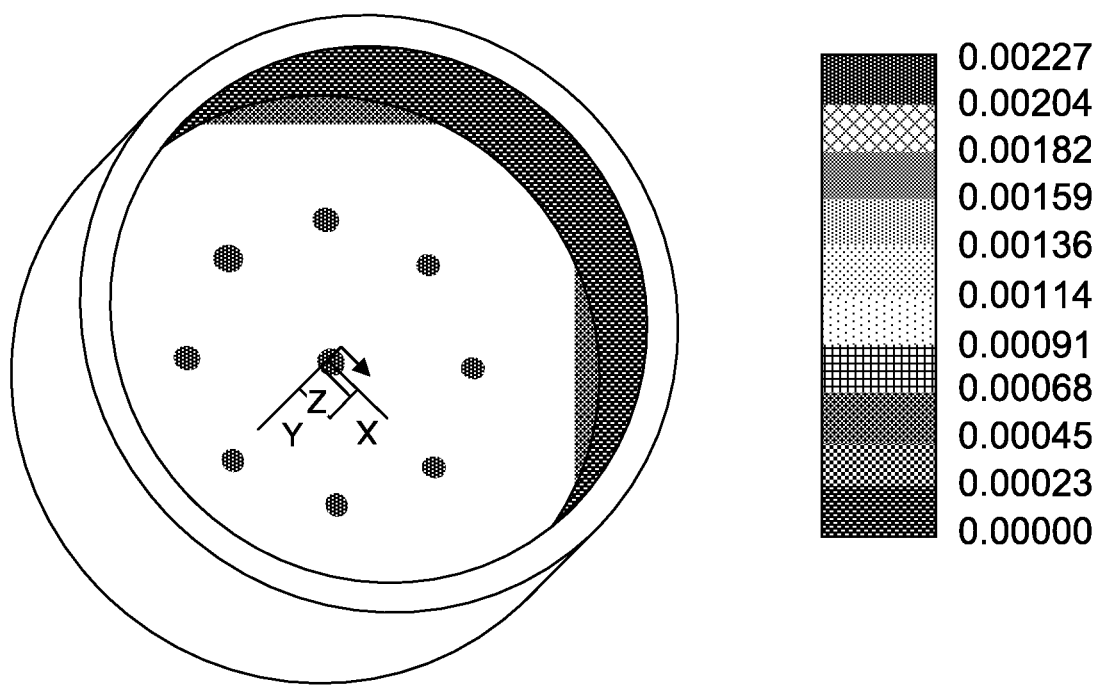
FIG. 15 shows peak calculated deformation in a cap of the current disclosure.

Results from the stress analysis of the cap modeled in 420 stainless steel are shown in FIGS. 14 and 15. A static load of 2 tons was distributed equally across the nine circular surface regions representative of the nine straight-rod plungers in the assembly. The peak value of von Mises stress calculated from the simulation was approximately 9.50E+7 Pa and is shown in FIG. 14. This stress value was two orders of magnitude lower than the reported yield strength of the 420 stainless steel; therefore, no plastic deformation was predicted to occur. The peak calculated elastic deformation value in the cap was approximately 2.27E-6 m and is shown in FIG. 15. Due to the calculated von Mises stress and elastic deformation values, no mechanical failure was predicted to occur in the cap during the loading situation imposed by the press.

Figure 16:
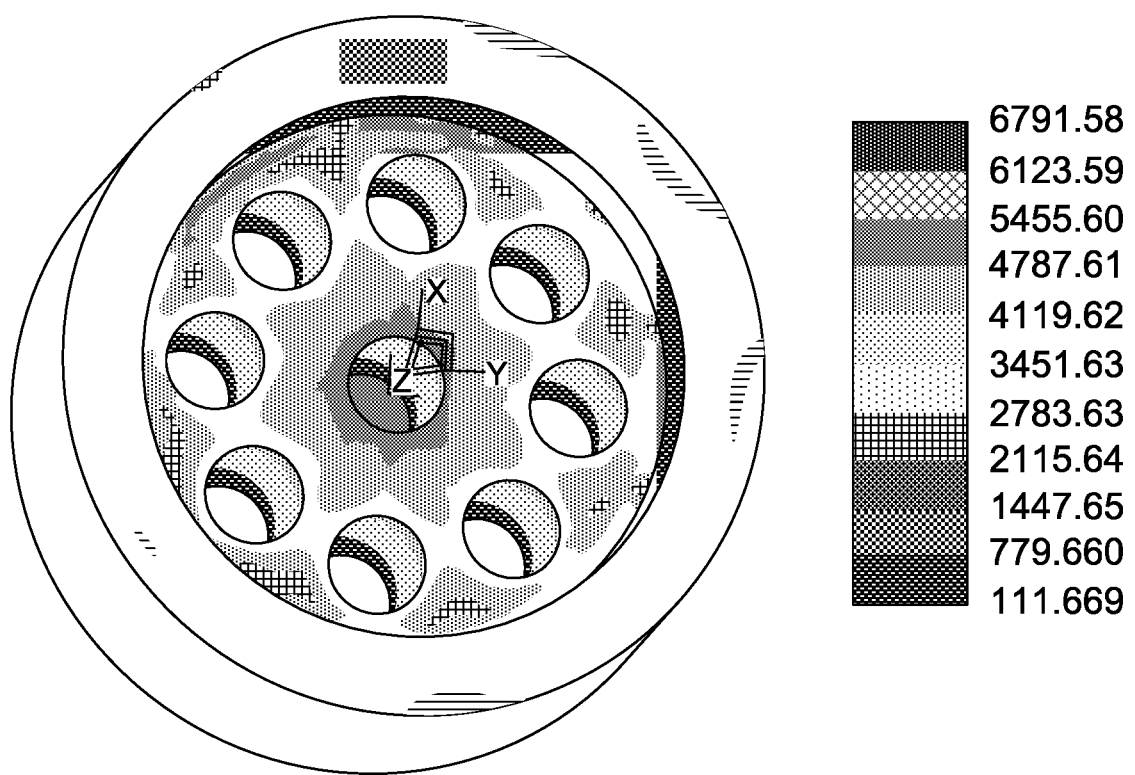
FIG. 16 shows calculated von Mises stress in the ejection base of the current disclosure.
Figure 17:
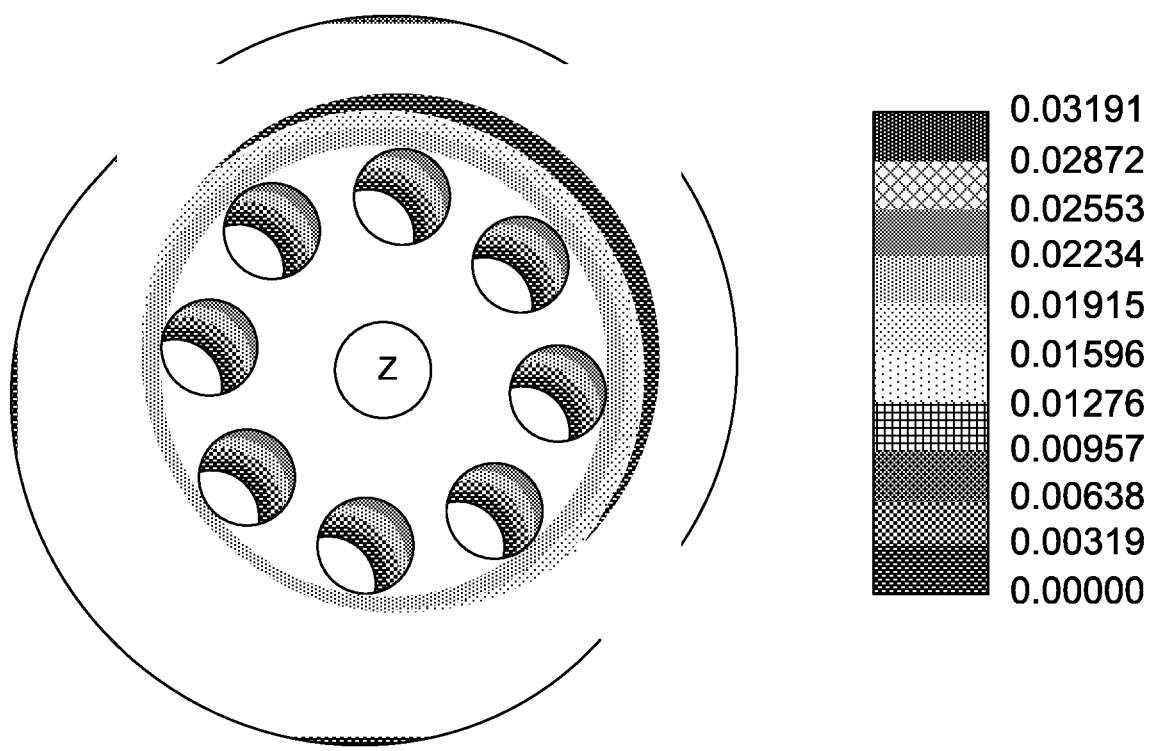
FIG. 17 shows peak calculated deformation of an ejection base of the current disclosure.

Results from the Creo Parametric stress analysis of the ejection base modeled in Delrin (unfilled) are shown below in FIGS. 16 and 17. A static load of 0.5 tons, the maximum load the hand press can apply, was distributed equally across the nine circular surface regions representative of the nine straight-rod plungers in the assembly. The peak calculated von Mises stress was approximately 6.79E+6 Pa and is shown in FIG. 16. This calculated value of the von Mises stress was an order of magnitude lower than the reported yield strength of the Delrin (unfilled); therefore, no plastic deformation was predicted to occur. The peak calculated elastic deformation value was approximately 3.19E-5 m and was concentrated around the central ejection chamber of the ejection base as shown in FIG. 17. Due to the calculated von Mises stress and elastic deformation values, no mechanical failure was predicted to occur in the ejection base by the hand press when removing scaffolds from the die after pressing.

In one embodiment, the multi-chamber pellet die is composed of at least eight pellet chambers with 8 mm upper diameters arranged in a 26 mm bolt circle formation around 1 central pellet chamber of the same diameter. While nine pellet chambers are disclosed, more or less chambers are considered within the scope of this disclosure for all embodiments. The multiple chamber design of the current disclosure is novel because there are no other multi-pellet designs currently available.

The depth of the upper portion allows for loading of the 6.4 mm long Specac anvils (available from Specac Limited, Registered Office, Orpington, Kent, England) from the top surface of the die by hand rather than by using tweezers. The 5 mm diameter of the lower portion of the pellet chamber was also maintained to accommodate the use of Specac anvils. Additionally, a 118° countersink hole was used to provide an angled "stepdown" transition from the larger diameter upper portion of the pellet chamber to the smaller diameter lower portion. This angled transition was implemented in order to prevent the buildup of sample mass in the "stepdown" portion during pellet formation and prevent the Specac anvils from becoming lodged within the upper portion of the chamber.

The current disclosure, in order to eliminate the formation of a stress concentration in the plungers of the pellet die, adopted a straightrod or cylindrical geometry for the rods. In one embodiment, the diameter of the rod is constant throughout its length and there are no bends or angles defined throughout its length. In a further, the rods may have a diameter of 4.92 mm. The ejection base serves to remove the Specac stainless steel anvils and biomaterial scaffolds or pellets used for IR spectroscopy from the evacuable pellet die chambers once the scaffolds or pellets have been pressed. In the ejection base, eight ejection chambers with 7 mm diameters were added in a 26 mm bolt circle pattern around a central ejection chamber of the same diameter. The diameters of the ejection chambers were intentionally oversized compared to the diameters of the lower portion of the pellet die chambers in order to ensure that the dislodged anvils and sample pellets would experience no added resistance as they were ejected from the die. The ejection base of the current disclosure is also novel because it has multiple holes to fit with the multi-chamber pellet die.

In a further embodiment, a cap component was designed in order to equally distribute the load applied across all nine plungers. The design of the cap includes a 10 mm thick flat surface which contacts the straightrod plungers inside the 49.25 mm wide inner central chamber. The inner cap chamber is 21 mm deep. The dimensions of the inner central chamber allow the wall of the cap to enclose the outer diameter of the multi-chamber pellet die, so the flat surface inside the central chamber remains perpendicular to the straightrod plungers as the load is applied. In this way, the outer diameter of the evacuable pellet die serves as a guide to ensure the inner diameter of the cap and the outer diameter of the die remain aligned as concentric circles. Therefore, this portion of the design would resist to resist motion that could introduce shear forces to the straightrod plungers. The multi-chamber pellet die system of the current disclosure fabricates more pellets for IR Spectroscopy and small biomaterial scaffolds at one time. Therefore, more pellets and scaffolds may be created at faster rates.

Figure 19:
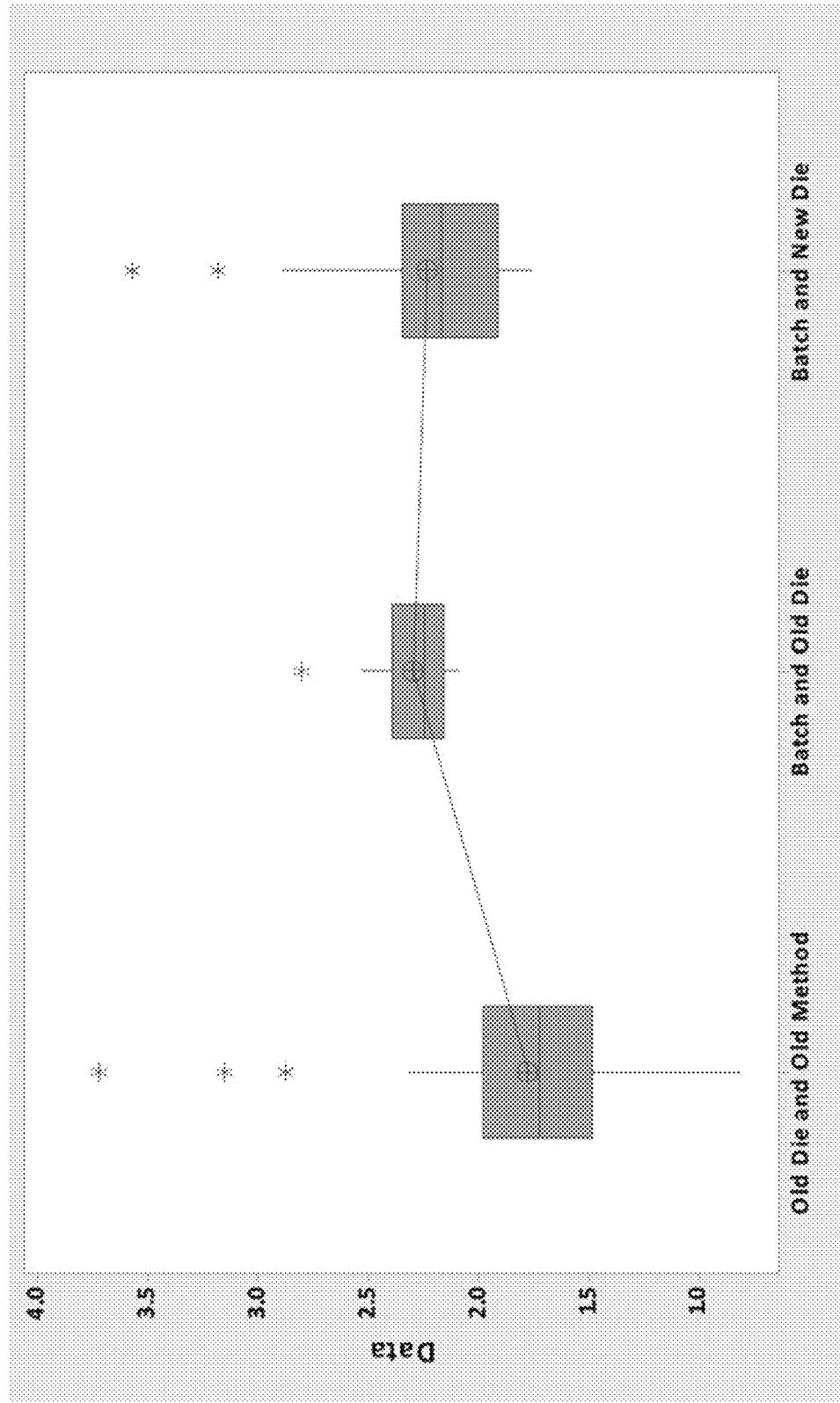
FIG. 19 shows a box and whisker plot illustrating Appendix 1.

The current disclosure provides a high-throughput batch mixing manufacturing protocol. The new batch mixing protocol allows for the creation of scaffolds of superior quality than those made with former methods. The current disclosure also reduces creation time over 50% for both old and new dies. The quality of the scaffolds was based on their final average mass after leaching. The p-values for the ANOVA and Tukey Pairwise Comparisons, shown in FIG. 18, which illustrates Table 1, indicate the new batch mixing method of the current disclosure, even with the original one-hole die, produced scaffolds that had statistically higher average masses than those produced with the old protocol. Therefore, the average masses produced with batch mixing were closer to the ideal weight of 2.5 mg. Not only was the final average mass closer to 2.5 mg, but when using the one-hole die, the variance of the scaffolds produced with the batch mixing protocol compared to the old protocol was significantly lower. Also, the variance of the scaffolds made with the batch mixing for both dies were not significantly different. However, the variance of the scaffolds produced with the old method and the one-hole die was not significantly different than scaffolds produced with the batch mixing and the nine-hole die. It is believed that the presence of outliers in the upper range of scaffold masses from the batch mixing protocol with the nine-hole die could have skewed the variance towards a higher value. A box and whisker plot illustrating these outliers can be seen in FIG. 19 as Appendix 1. Without the presence of these outliers, the variance of the batch mixing protocol with the nine-hole die may have been significantly lower than that of the one-hole die with the old protocol. In order to combat these outliers, further testing could be performed to optimize the loading scenario by varying the magnitude and duration of the load applied to the die.

Figure 20:
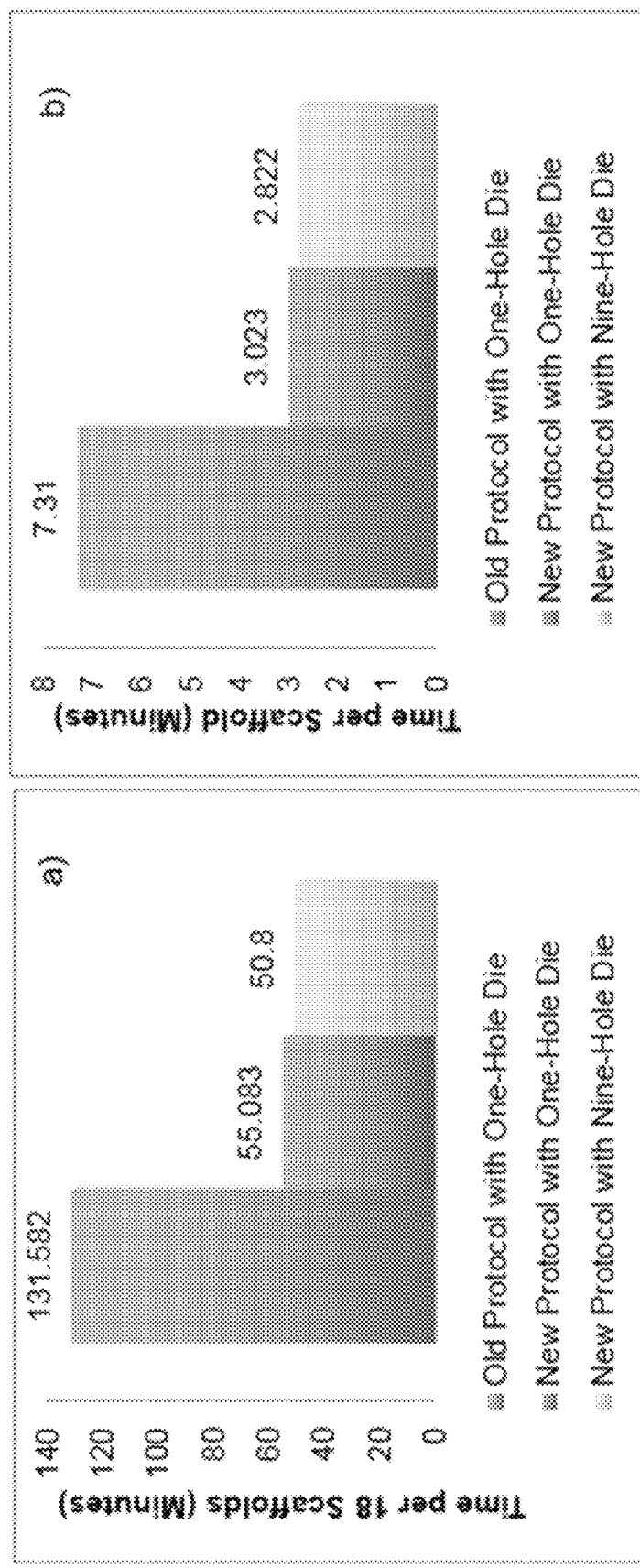
FIG. 20 shows the time data from the three scaffold production methods.

FIG. 20 shows the time data from the three scaffold production methods previously mentioned. It can be seen from FIG. 20 that the time it took to make scaffolds with the old protocol was almost double the time it took to make scaffolds with the new batch mixing protocol for both the one-hole and nine-hole dies. This is beneficial because it reduces the amount of time required to produce scaffolds, thus increasing the available time to perform other valuable experiments. Additionally, the nine-hole die did not drastically reduce the time to manufacture a batch of scaffolds when compared to the one-hole die using the batch mixing protocol. However, the nine-hole die increased productivity in a different way by reducing the number of individuals required to produce a batch of scaffolds. The one-hole die requires three people to manufacture a batch in the time reported, but the nine-hole die only required one person. Overall, the scaffold manufacturing process was modified to produce scaffolds in a more high-throughput manner which will tremendously benefit tissue engineering laboratories.

Figure 21:
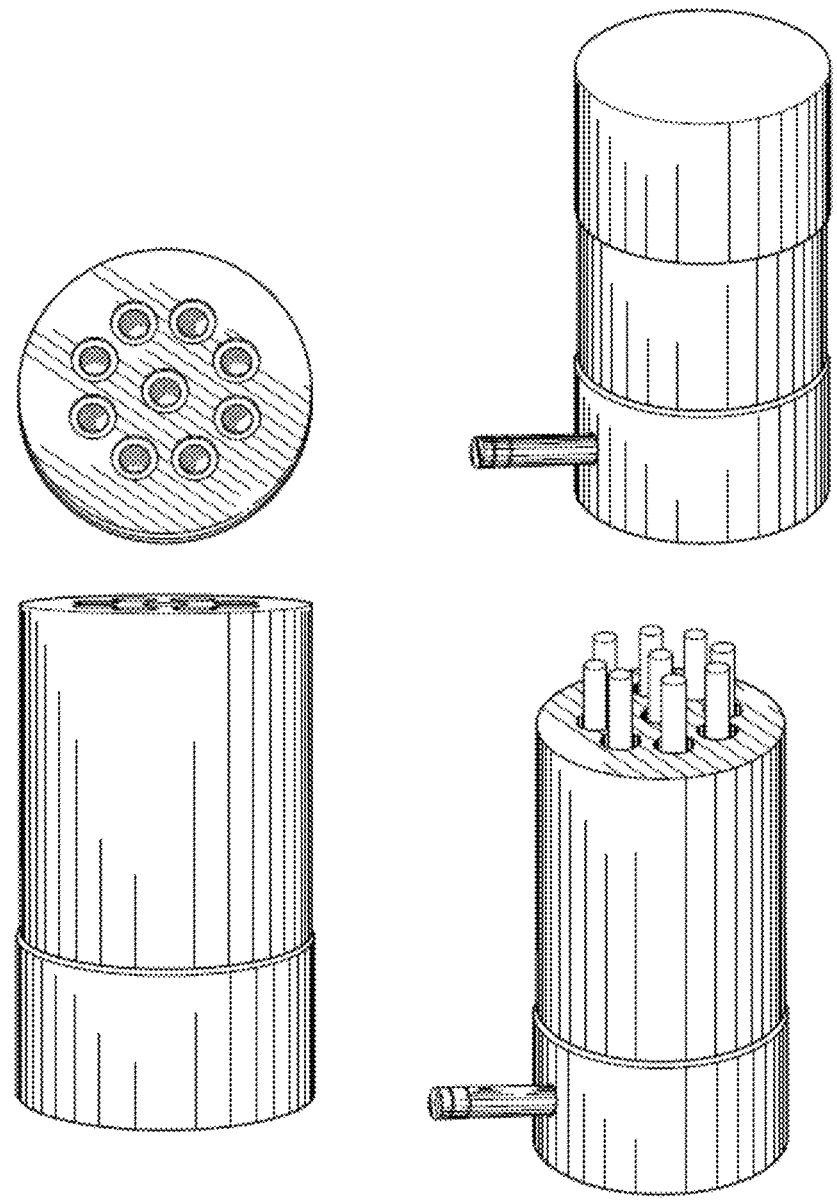
FIG. 21 shows one embodiment of a nine-hole die assembly of the current disclosure.
Figure 22:
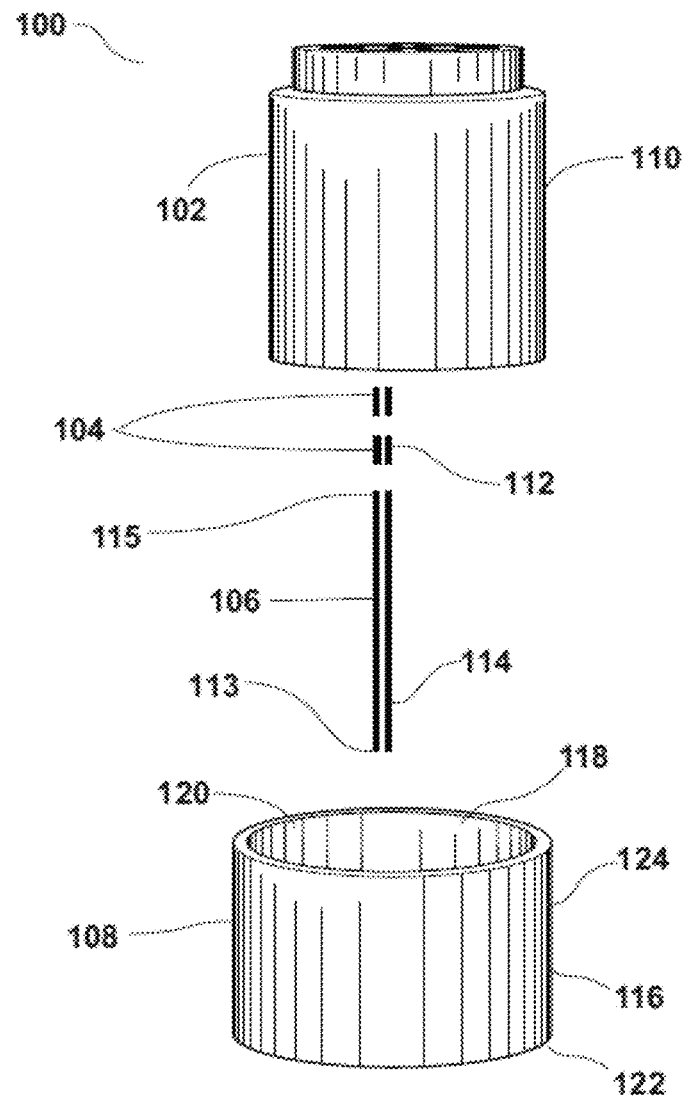
FIG. 22 shows an exploded view of one embodiment of a nine-hole die assembly of the current disclosure.

FIG. 21 shows one embodiment of a nine-hole die assembly of the current disclosure. FIG. 22 shows an exploded view of one embodiment of a die assembly 100 of the current disclosure. Die assembly 100, includes a die body 102, at least one anvil 104, a plunger 106, and a die cap 108. In some embodiments, there may be two anvils 104 in use, one positioned above the material to be pelleted and one positioned below the material to be pelleted. Die body 102 may be various shapes, such as angular, round, elongated, etc., as known to those skill in the art. In one embodiment, die body 102 is columnar in shape and includes a substantially continuous outer perimeter 110. Anvil 104 may be a single anvil or multiple anvils that may be stacked together, such as an end-to-end arrangement, to load die body 102. Anvils 104 may be varied in shape but in one preferred embodiment they are columnar and substantially solid defining no voids or cavities in anvil body 112. Plunger 106 may also be varied in shape with one preferred embodiment being columnar. Plunger body 114 may also be designed not to form voids or cavities within plunger body 114. Plunger body 114 also defines a flat proximal end 113 and flat distal end 115. Die cap 108 is formed to securely engage and fit over die body 102, thus, die cap 108 has a complimentary outer perimeter 116 that may vary in shape but this shape must allow overlaying engagement with die body 102. In a preferred embodiment, die cap 108 may be a hollowed column in shape defining an interior 118 and substantially continuous wall interior wall 120 as well as a base 122 and substantially continuous outer wall 124.

Figure 23A:
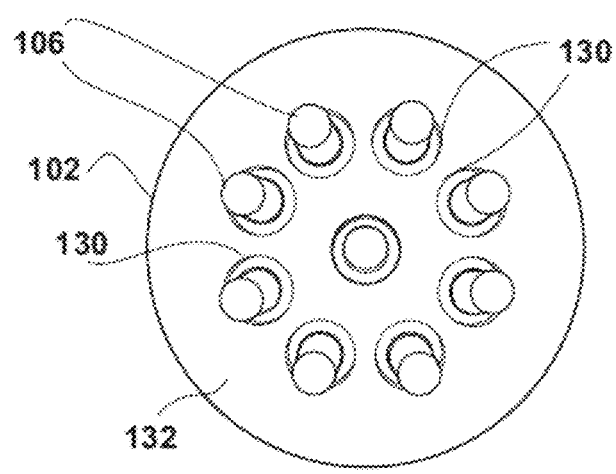
FIG. 23A shows a top down view of a die body of the current disclosure showing plungers inserted into load voids.

FIG. 23A shows a top down view of die body 102 showing plungers 106 inserted into load voids 130 defined within lower surface 132 of die body 102. Load voids 130 may be any shape, but load voids 130, anvil(s) 104 and plunger 106 must be shaped to achieve a complimentary and substantially tight male/female engagement in order to securely hold loads, not shown, deposited within load voids 130 and secured within load void 130 via anvil(s) 104. In a preferred embodiment, load voids 130 may be formed as substantially columnar voids to accommodate columnar shaped plunger 106 and columnar shaped anvil(s) 104. While nine (9) load voids 130 are shown in FIG. 23A, more or less voids are contemplated in this disclosure and the disclosure should not be viewed as limited to simply nine (9) load voids 130.

Figure 23B:
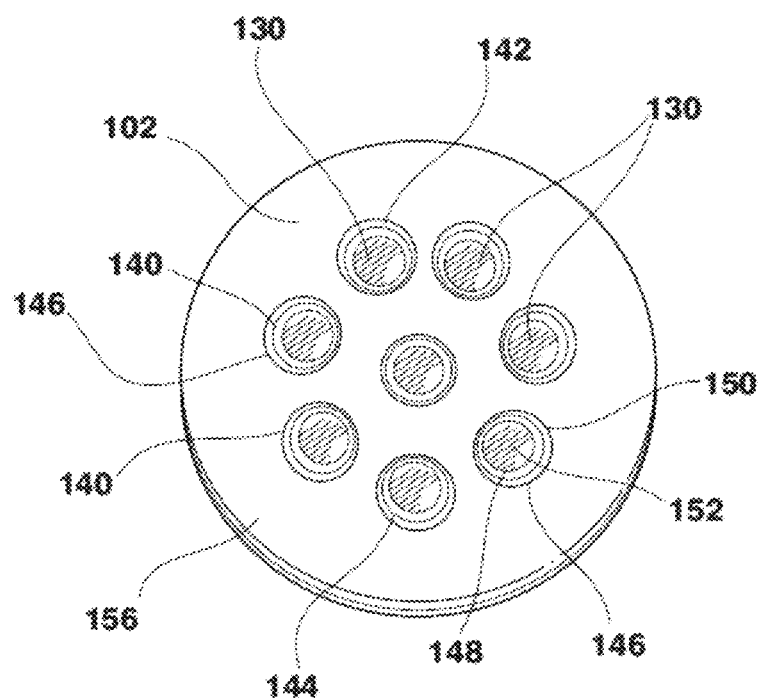
FIG. 23B shows a top down view of a die body wherein the load voids are empty.

FIG. 23B shows a top down view of a die body 102 wherein load voids 130 are empty. Step down 140 is shown defined within load void interior 142 to define loading ledge 144 within interior wall 146 of load void 130. Loading ledge 144 may include primary ledge 146 and other ledges such as secondary ledge 148 in order to form a multiple "step-down" configuration from load void upper portion 150 to load void lower portion 152 of load void 130. The depth employed in one instance is 6 mm. However, other depths are considered within the scope of this disclosure. The size of the ledges may also be varied from one embodiment to another. (More sections than primary ledge, such as secondary ledge, of loading ledge 144 are contemplated as disclosed herein and the current disclosure should not be limited to just the primary ledge and/or the primary and secondary ledge as more ledges may be defined to aid with loading). Loading ledge 144 may be positioned at an angle with respect to die body loading surface 156, for instance, loading ledge 144 may form an obtuse angle with respect to loading face 156. In a preferred embodiment, loading ledge forms a 118 degree angle with respect to loading face 156. Further, while FIG. 23B shows load voids 130 as all having the same shape, other configurations are considered disclosed by this disclosure. For example, one or more load voids 130 may have a different or unique shape as compared to the remaining load voids 130 defined within die body 102. In other configurations, all load voids 130 may have different shapes from one another. Further yet, alternating shapes, such as circle, triangle, square, circle, triangle, etc., may be applied to the loading voids to help distribute load and stress. These shape differences allow for specifically forming desired shaped pellets or for accommodating different materials within a single pressing.

Figure 24:
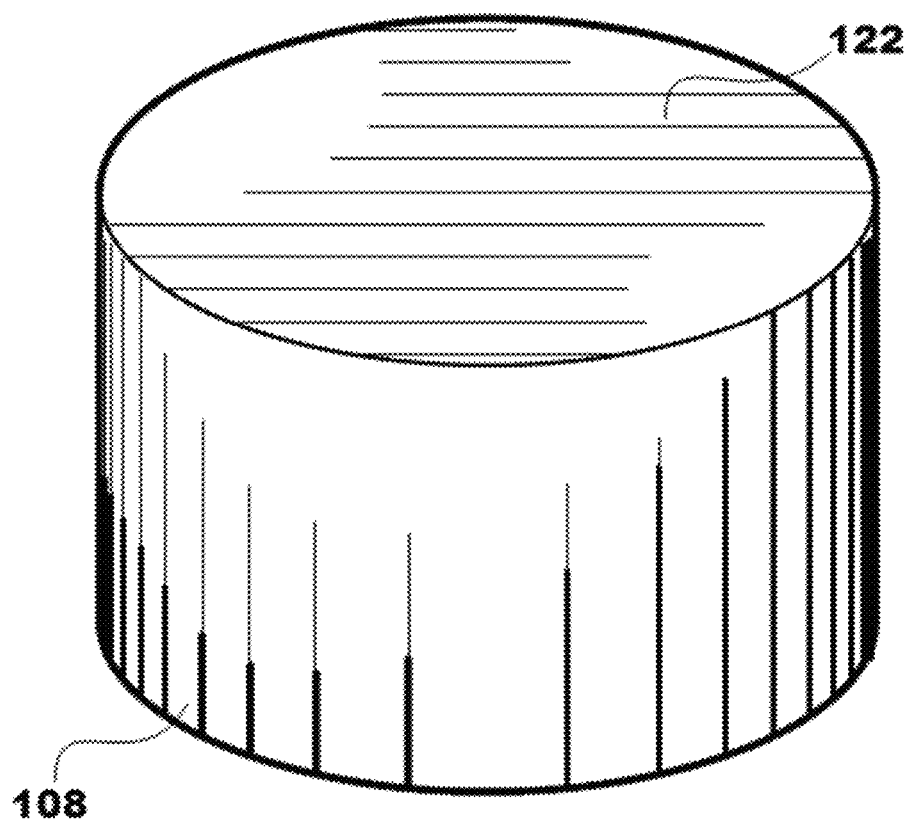
FIG. 24 shows an end view of a die cap of the current disclosure.
Figure 25:
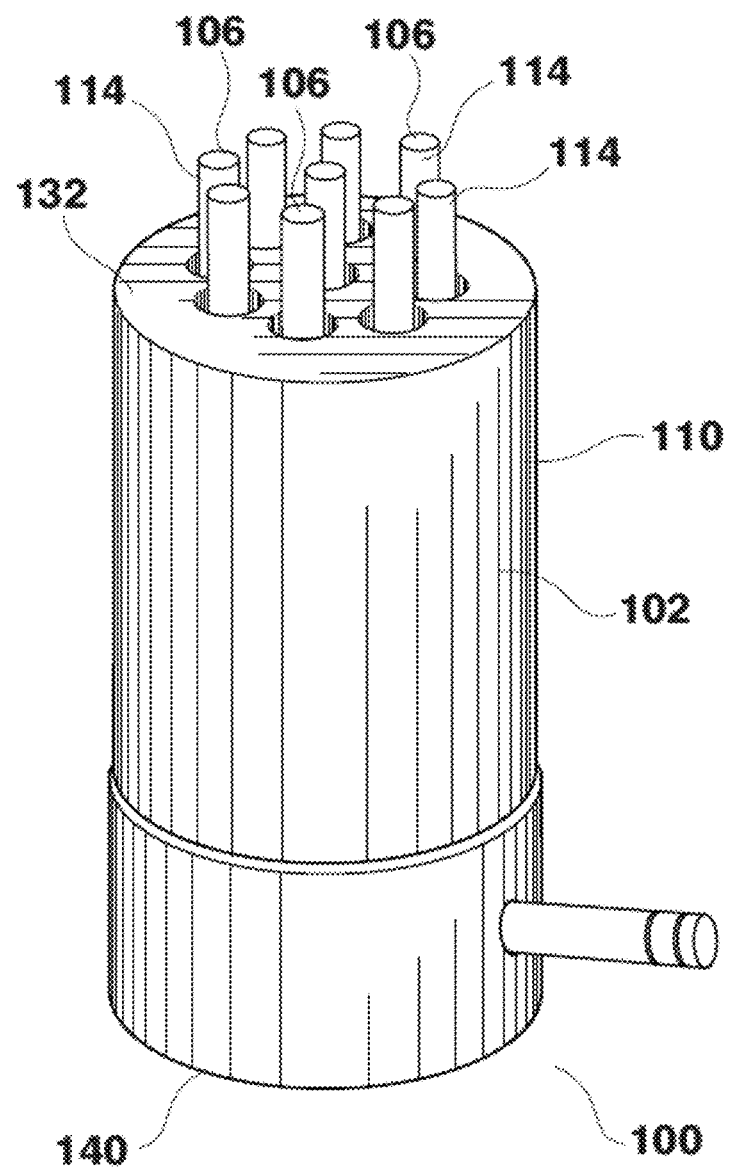
FIG. 25 shows an assembled die of the current disclosure attached to a base without a die cap.
Figure 26:
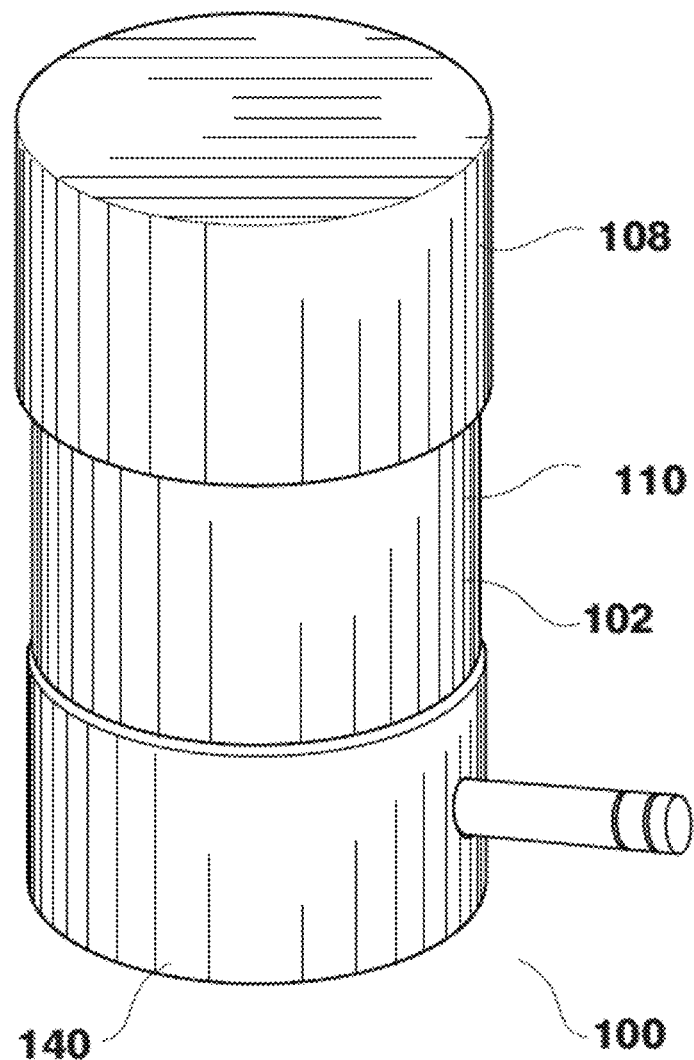
FIG. 26 shows a fully assembled die of the current disclosure attached to a base with a die cap.

FIG. 24 shows an end view of die cap 108 and die cap base 122. FIG. 25 shows an assembled die 100 of the current disclosure attached to a base 140 without die cap 108. FIG. 26 shows a fully assembled die of the current disclosure attached to a base with a die cap.

Figure 27:
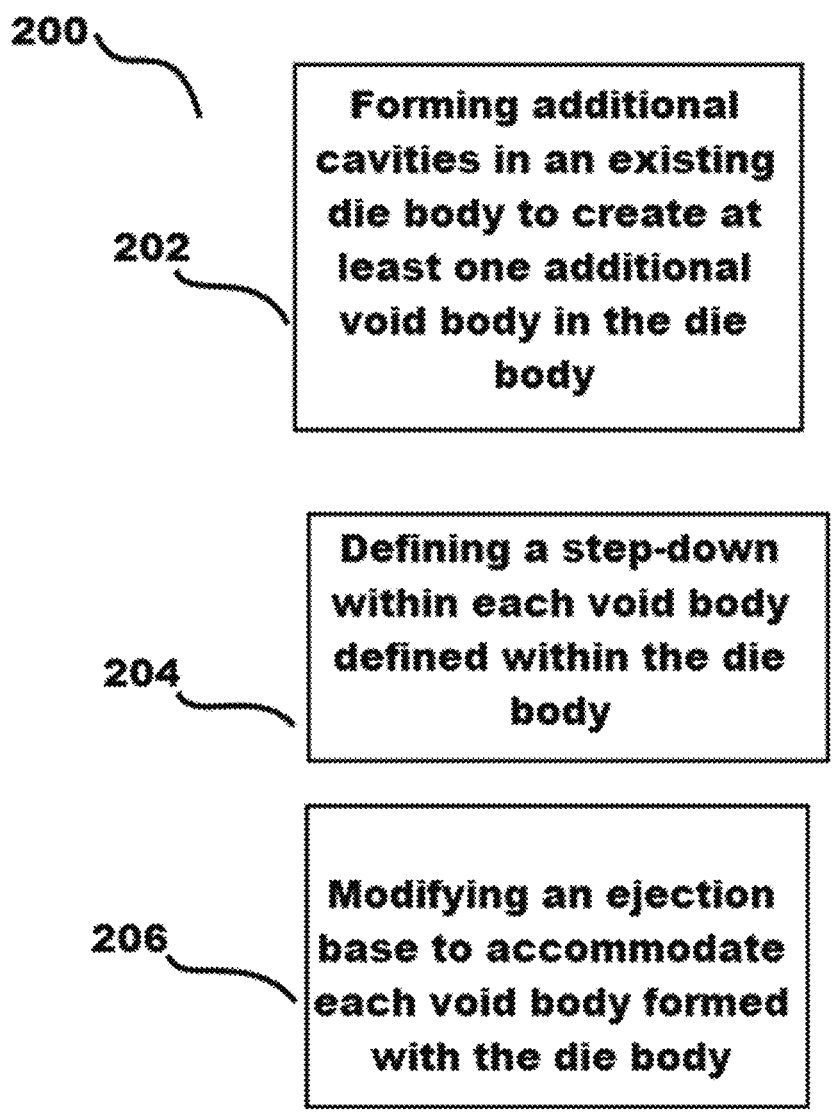
FIG. 27 shows a method of retrofitting an existing die assembly to form a multi-chamber pellet die system of the current disclosure It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

FIG. 27 shows a method of retrofitting an existing die assembly 200 to form a multi-chamber pellet die system of the current disclosure. At step 202, an existing die body is modified by forming additional cavities in the existing die body to create at least one additional void body in the existing die body. At step 204, a step-down is defined within each void body within the existing die body. At step 206, an ejection base is modified to accommodate each void body formed within the existing die body and to evacuate each void body. The void bodies may be formed so that they counter-balance one another with respect to load distribution throughout the die body. The step-down may comprise at least a first ledge defined by an interior wall of each loading chamber. The step-down may also be positioned at an obtuse angle with respect to a loading face of the die body. Each loading chamber, at least one anvil, and at least plunger have complimentary shapes to one another allowing for male-female engagement between each anvil and plunger with each loading chamber. In other embodiments, the at least one loading chamber has a different shape as compared to a shape of the other loading chambers defined in the die body. Further, the plunger may be shaped to have a substantially straightrod geometry. Also, the plunger may be substantially columnar in shape with a substantially flat proximal and substantially flat distal end.

In one embodiment, a user may pick up the die components and clean them according to the lab-specific protocol. The user then prepares the mixture that will be pressed in the die. One then attaches the specac evacuable pellet die base to the Die. Next, load the bottom anvil in each chamber. The funnel is then inserted into one of the chambers. Powder is then loaded on top of the anvil at the bottom of the chamber. The user then ensures all powder is at the bottom of the chamber, above the anvil. The funnel is removed and a second anvil is loaded on top of the powder. The anvils described in the current disclosure may be inserted by hand whereas a typical Specac design requires the use of tweezers and increases time and difficulty. Next, a straight rod plunger is inserted on top of the second anvil. The above process is then repeated for all chambers in the die. Once all plungers are inserted, the user secures the cap on top of the plungers so that the overhanging region hugs the outside of the die. Then the user places the assembly in the pellet press and applies desired pressure to the top of the cap. Next, the user removes the assembly, and replaces the specac evacuable pellet die with the Delrin base and places the assembly in a petri dish. Then the user applies pressure with the pellet press so that the bottom anvils, pellet and top anvils pass through the die and Delrin base into the petri dish. The user may then remove all die components and retrieve the formed pellets. When finished making pellets, the user cleans the device components according to the same lab-specific cleaning protocol.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for retrofitting a pellet die system to form a multi-chamber pellet die system comprising;
   modifying an existing die body by:
      forming additional cavities in the existing die body to create at least one additional void body in the existing die body wherein at least one anvil and at least one plunger engage to form the additional void body;
      defining a step-down within each void body within the existing die body wherein the step down is contiguous with a portion of an interior wall and the step-down is formed below and substantially adjacent to an opening wherein the at least one plunger enters into a loading chamber and defined by a first ledge positioned at an angle with respect to the interior wall of the loading chamber wherein the first ledge contacts and guides the at least one plunger entering the loading chamber; and
   modifying an ejection base to accommodate each void body formed within the existing die body and to evacuate each void body.

2. The method for retrofitting a pellet die system to form a multi-chamber pellet die system of claim 1, wherein the void bodies are formed so that they counter-balance one another with respect to load distribution throughout the die body.

3. The method for retrofitting a pellet die system to form a multi-chamber pellet die system of claim 1, wherein the step-down is positioned at an obtuse angle with respect to a loading face of the die body.

4. The method for retrofitting a pellet die system to form a multi-chamber pellet die system of claim 1, wherein each loading chamber, at least one anvil, and the at least plunger have complimentary shapes to one another allowing for male-female engagement between each anvil and plunger with each loading chamber.

5. The method for retrofitting a pellet die system to form a multi-chamber pellet die system of claim 4, wherein at least one loading chamber has a different shape as compared to a shape of the other loading chambers defined in the die body.

6. The method for retrofitting a pellet die system to form a multi-chamber pellet die system of claim 1, wherein the plunger is shaped to have a substantially cylindrical geometry.

7. The method for retrofitting a pellet die system to form a multi-chamber pellet die system of claim 6, wherein the plunger is substantially columnar in shape with a substantially flat proximal and substantially flat distal end.

* * * * *